United States Patent
Nemoto et al.

(10) Patent No.: US 8,217,090 B2
(45) Date of Patent: *Jul. 10, 2012

(54) ELASTOMER POROUS MATERIAL AND METHOD OF PRODUCING THE SAME

(75) Inventors: Wataru Nemoto, Tokyo (JP); Kazuya Takato, Tokyo (JP); Asuka Koyanagi, Tokyo (JP); Jun Ogawa, Tokyo (JP); Atsushi Ikeda, Tokyo (JP)

(73) Assignee: Synztec Co., Ltd., Tokyo (JP)

(*) Notice: Subject to any disclaimer, the term of this patent is extended or adjusted under 35 U.S.C. 154(b) by 179 days.

This patent is subject to a terminal disclaimer.

(21) Appl. No.: 12/745,669

(22) PCT Filed: Dec. 1, 2008

(86) PCT No.: PCT/JP2008/071827
§ 371 (c)(1),
(2), (4) Date: Jun. 1, 2010

(87) PCT Pub. No.: WO2009/069805
PCT Pub. Date: Jun. 4, 2009

(65) Prior Publication Data
US 2010/0305225 A1 Dec. 2, 2010

(30) Foreign Application Priority Data
Nov. 30, 2007 (JP) ................. 2007-311801

(51) Int. Cl.
*C08J 5/02* (2006.01)
*C08J 9/00* (2006.01)
(52) U.S. Cl. ............. 521/65; 521/50; 521/154; 428/332
(58) Field of Classification Search ............ 521/65, 521/50, 154
See application file for complete search history.

(56) References Cited

U.S. PATENT DOCUMENTS
2005/0143480 A1 6/2005 Hirayama et al.
2010/0272989 A1* 10/2010 Nemoto et al. ............ 428/332
2010/0311851 A1* 12/2010 Nemoto et al. ............ 521/65

FOREIGN PATENT DOCUMENTS
| JP | 6-287348 | 10/1994 |
| JP | 10-025374 | 1/1998 |
| JP | 2000-296668 | 10/2000 |
| JP | 2004-143332 | 5/2004 |
| JP | 2005-206784 | 8/2005 |
| JP | 2006-052262 | 2/2006 |
| JP | 2006-308716 | 11/2006 |

OTHER PUBLICATIONS

International Search Report, PCT/JP2008/071827, Feb. 3, 2009.

* cited by examiner

*Primary Examiner* — Randy Gulakowski
*Assistant Examiner* — Kara Boyle
(74) *Attorney, Agent, or Firm* — Young & Thompson

(57) ABSTRACT

In the elastomer porous material of the invention, when cells in a first observation region of a first cross section are observed at a certain magnification, cells having a shape factor SF2, which indicates the remoteness from complete roundness and is represented by the following formula:

$$SF2 = \frac{P^2}{4\pi A} \times 100$$

(wherein A represents the area of each cell, and P represents the perimeter length thereof), of 130 or less account for 80% or more of all cells in the first observation region, and, when cells in a second observation region of a second cross section orthogonal to the first cross section are observed at a certain magnification, cells having a shape factor SF2, which indicates the remoteness from complete roundness and is represented by the same formula (wherein A represents the area of each cell, and P represents the perimeter length thereof), of 130 or less account for 80% or more of all cells in the second observation region.

14 Claims, 33 Drawing Sheets

Example 1

SEM photograph of radial cross section

First observation region

Example 1

SEM photograph of radial cross section

First observation region

Example 1

SEM photograph of longitudinal cross section

Second observation region

Example 2

SEM photograph of radial cross section

First observation region

Example 2

SEM photograph of longitudinal cross section

Second observation region

Example 3

SEM photograph of radial cross section

First observation region

Example 3

SEM photograph of longitudinal cross section

Second observation region

Comparative Example 1

SEM photograph of radial cross section

First observation region

Comparative Example 1

SEM photograph of longitudinal cross section

Second observation region

Comparative Example 2

SEM photograph of radial cross section

First observation region

Comparative Example 2

SEM photograph of longitudinal cross section

Second observation region

Comparative Example 3

SEM photograph of radial cross section

First observation region

Comparative Example 3

SEM photograph of longitudinal cross section

Second observation region

US 8,217,090 B2

ELASTOMER POROUS MATERIAL AND METHOD OF PRODUCING THE SAME

This application is a 35 U.S.C. 371 national stage of International application PCT/JP2008/071827 filed on Dec. 1, 2008; which claimed priority to Japan application 2007-311801 filed on Nov. 30, 2007. The entire contents of each of the above-identified applications are hereby incorporated by reference.

FIELD OF THE INVENTION

The invention relates to an elastomer porous material such as a silicone elastomer porous material, and to a method for producing the elastomer porous material. More particularly, the present invention relates to an elastomer porous material having substantially true spherical cells, and to a method for producing the elastomer porous material.

BACKGROUND OF THE INVENTION

Silicone elastomer porous materials are used in a variety of fields; for example, in components of image-forming devices (e.g., copying machines and laser printers), including a developing roller, a toner-feeding roller, a transfer roller, and a cleaning roller. Also, silicone elastomer porous materials are used in paper-sheet-feeding rollers of copying machines, various types of printers, and plotters, as well as in fixing components (e.g., a fixing roller and a pressure roller).

Hitherto, porous materials have generally been produced by means of foaming action. In a technique for causing foaming action, a chemical foaming agent, a gas, or water is used as a foaming agent.

In most cases of production of a silicone elastomer porous material, such a foaming agent is also used. However, in conventional methods for producing such a silicone elastomer porous material, curing of silicone rubber and foaming are performed in parallel, and thus the resultant porous material has cells (pores) which are not uniform in size; i.e., their sizes considerably differ from one cell to another. In addition, difficulty is encountered in forming spherical cells having a small size.

In view of the foregoing, Patent Document 1 discloses a method for producing a silicone elastomer porous material by freezing a room-temperature-curable organopolysiloxane emulsion containing, for example, an organopolysiloxane having a silanol group, a specific cross-linking agent, a curing catalyst, and an emulsifier, and drying the frozen emulsion by sublimation of water without thawing. However, this method also encounters difficulty in producing a porous material having small cells of uniform size.

When a silicone elastomer porous material produced by use of a foaming agent is used in a fixing roller, since the porous material has large cells of non-uniform size, the fixing roller poses problems in that it exhibits inconsistent form upon heating, and, when torque is applied to the fixing roller, the roller is likely to break due to failure to achieve uniform distribution of the torque. When a porous material having large-sized cells is used in, for example, a pressure roller, the contours of the cells may appear on a formed image. Thus, demand has arisen for a silicone elastomer porous material having small cells of uniform size.

The present applicant previously applied for a patent on a closed-cell silicone elastomer porous material which is produced essentially from a water-in-oil emulsion containing water and a liquid silicone rubber material that forms a silicone elastomer through curing (see Patent Document 2).

However, on the basis of subsequent studies, the present inventors have found that the thus-produced silicone elastomer porous material has cells attributed to the water-in-oil emulsion, as well as cells attributed to bubbles entrained upon preparation of the water-in-oil emulsion, and thus the porous material is unsatisfactory in terms of properties (in particular, durability) required of a silicone elastomer porous material.

Patent Document 1: Japanese Patent Application Laid-Open (kokai) No. H06-287348
Patent Document 2: Japanese Patent Application Laid-Open (kokai) No. 2005-206784

DISCLOSURE OF THE INVENTION

Summary of the Invention

In view of the foregoing, an object of the present invention is to provide an elastomer porous material which is produced from an emulsion, and which has substantially true spherical cells. Another object of the present invention is to provide a method for producing the elastomer porous material.

In a first mode of the present invention attaining the aforementioned objects, there is provided an elastomer porous material, characterized in that, when cells in a first observation region of a first cross section are observed at a certain magnification, cells having a shape factor SF2, which indicates the remoteness from complete roundness and is represented by the following formula:

$$SF2 = \frac{P^2}{4\pi A} \times 100 \qquad [F1]$$

(wherein A represents the area of each cell, and P represents the perimeter length thereof), of 130 or less account for 80% or more of all cells in the first observation region, and, when cells in a second observation region of a second cross section orthogonal to the first cross section are observed at a certain magnification, cells having a shape factor SF2, which indicates the remoteness from complete roundness and is represented by the same formula (wherein A represents the area of each cell, and P represents the perimeter length thereof), of 130 or less account for 80% or more of all cells in the second observation region.

A second mode of the present invention is drawn to a specific embodiment of the elastomer porous material as described above, which is produced from an emulsion composition comprising, as a continuous phase, a liquid rubber material which forms an elastomer through curing.

A third mode of the present invention is drawn to a specific embodiment of the elastomer porous material as described above, wherein the liquid rubber material is a liquid silicone rubber material.

A fourth mode of the present invention is drawn to a specific embodiment of the elastomer porous material as described above, wherein, in the first or second observation region, cells having a diameter of 50 μm or less account for 50% or more of all cells.

A fifth mode of the present invention is drawn to a specific embodiment of the elastomer porous material as described above, wherein, in each of the first and second observation regions, cells having an aspect ratio a/b, wherein a represents the length of the major axis of the perimeter of each cell (hereinafter referred to as "maximum diameter") and b represents the length of the minor axis of that cell as measured in a direction orthogonal thereto, of 1.3 or less account for 70% or more of all cells.

A sixth mode of the present invention is drawn to a specific embodiment of the elastomer porous material as described above, which exhibits a porosity of 30% or more and has 200 or more cells per mm² as observed in a cross section.

In a seventh mode of the present invention, there is provided a roll member characterized by comprising the elastomer porous material as recited in any of the first to sixth modes.

In an eighth mode of the present invention, there is provided a fixing member characterized by comprising the elastomer porous material as recited in any of the first to sixth modes.

In a ninth mode of the present invention, there is provided a method for producing an elastomer porous material, characterized in that the method comprises preparing, under reduced pressure, an emulsion composition comprising, as a continuous phase, a liquid rubber material which forms an elastomer through curing; and curing the emulsion composition while removing a dispersion phase, to thereby produce an elastomer porous material wherein, when cells in a first observation region of a first cross section are observed at a certain magnification, cells having a shape factor SF2, which indicates the remoteness from complete roundness and is represented by the following formula:

$$SF2 = \frac{P^2}{4\pi A} \times 100 \quad [F2]$$

(wherein A represents the area of each cell, and P represents the perimeter length thereof), of 130 or less account for 80% or more of all cells in the first observation region, and, when cells in a second observation region of a second cross section orthogonal to the first cross section are observed at a certain magnification, cells having a shape factor SF2, which indicates the remoteness from complete roundness and is represented by the same formula (wherein A represents the area of each cell, and P represents the perimeter length thereof), of 130 or less account for 80% or more of all cells in the second observation region.

A tenth mode of the present invention is drawn to a specific embodiment of the elastomer porous material production method as described above, wherein the liquid rubber material is a liquid silicone rubber material.

An eleventh mode of the present invention is drawn to a specific embodiment of the elastomer porous material production method as described above, wherein the emulsion composition is a water-in-oil emulsion composition comprising a liquid silicone rubber material, a silicone oil material having interfacial activity, and water.

A twelfth mode of the present invention is drawn to a specific embodiment of the elastomer porous material production method as described above, which produces an elastomer porous material wherein, in the first or second observation region, cells having a diameter of 50 μm or less account for 50% or more of all cells.

A thirteenth mode of the present invention is drawn to a specific embodiment of the elastomer porous material production method as described above, which produces an elastomer porous material wherein, in each of the first and second observation regions, cells having an aspect ratio a/b, wherein a represents the maximum diameter of each cell and b represents the length of the minor axis of that cell as measured in a direction orthogonal thereto, of 1.3 or less account for 70% or more of all cells.

A fourteenth mode of the present invention is drawn to a specific embodiment of the elastomer porous material production method as described above, which produces an elastomer porous material exhibiting a porosity of 30% or more and having 200 or more cells per mm² as observed in a cross section.

Effects of the Invention

According to the present invention, there can be provided an elastomer porous material having substantially true spherical and fine cells and exhibiting excellent durability.

BRIEF DESCRIPTION OF THE DRAWINGS

FIG. 1 shows an SEM photograph of a radial cross section and a first observation region in Example 1.
FIG. 2 shows an SEM photograph of a longitudinal cross section and a second observation region in Example 1.
FIG. 3 shows an SEM photograph of a radial cross section and a first observation region in Example 2.
FIG. 4 shows an SEM photograph of a longitudinal cross section and a second observation region in Example 2.
FIG. 5 shows an SEM photograph of a radial cross section and a first observation region in Example 3.
FIG. 6 shows an SEM photograph of a longitudinal cross section and a second observation region in Example 3.
FIG. 7 shows an SEM photograph of a radial cross section and a first observation region in Comparative Example 1.
FIG. 8 shows an SEM photograph of a longitudinal cross section and a second observation region in Comparative Example 1.
FIG. 9 shows an SEM photograph of a radial cross section and a first observation region in Comparative Example 2.
FIG. 10 shows an SEM photograph of a longitudinal cross section and a second observation region in Comparative Example 2.
FIG. 11 shows an SEM photograph of a radial cross section and a first observation region in Comparative Example 3.
FIG. 12 shows an SEM photograph of a longitudinal cross section and a second observation region in Comparative Example 3.
FIG. 13 is a graph showing SF1 distribution in the first observation region in Example 1.
FIG. 14 is a graph showing SF1 distribution in the second observation region in Example 1.
FIG. 15 is a graph showing SF1 distribution in the first observation region in Example 2.

FIG. 16 is a graph showing SF1 distribution in the second observation region in Example 2.
FIG. 17 is a graph showing SF1 distribution in the first observation region in Example 3.
FIG. 18 is a graph showing SF1 distribution in the second observation region in Example 3.
FIG. 19 is a graph showing SF1 distribution in the first observation region in Comparative Example 1.
FIG. 20 is a graph showing SF1 distribution in the second observation region in Comparative Example 1.
FIG. 21 is a graph showing SF1 distribution in the first observation region in Comparative Example 2.
FIG. 22 is a graph showing SF1 distribution in the second observation region in Comparative Example 2.
FIG. 23 is a graph showing SF1 distribution in the first observation region in Comparative Example 3.
FIG. 24 is a graph showing SF1 distribution in the second observation region in Comparative Example 3.
FIG. 25 is a graph showing SF2 distribution in the first observation region in Example 1.
FIG. 26 is a graph showing SF2 distribution in the second observation region in Example 1.
FIG. 27 is a graph showing SF2 distribution in the first observation region in Example 2.
FIG. 28 is a graph showing SF2 distribution in the second observation region in Example 2.
FIG. 29 is a graph showing SF2 distribution in the first observation region in Example 3.
FIG. 30 is a graph showing SF2 distribution in the second observation region in Example 3.
FIG. 31 is a graph showing SF2 distribution in the first observation region in Comparative Example 1.
FIG. 32 is a graph showing SF2 distribution in the second observation region in Comparative Example 1.
FIG. 33 is a graph showing SF2 distribution in the first observation region in Comparative Example 2.
FIG. 34 is a graph showing SF2 distribution in the second observation in Comparative Example 2.
FIG. 35 is a graph showing SF2 distribution in the first observation region in Comparative Example 3.
FIG. 36 is a graph showing SF2 distribution in the second observation region in Comparative Example 3.
FIG. 37 is a schematic representation of the internal structure of a belt fixing apparatus employed in Test Example 3.

DESCRIPTION OF REFERENCE NUMERALS

Figure 1:
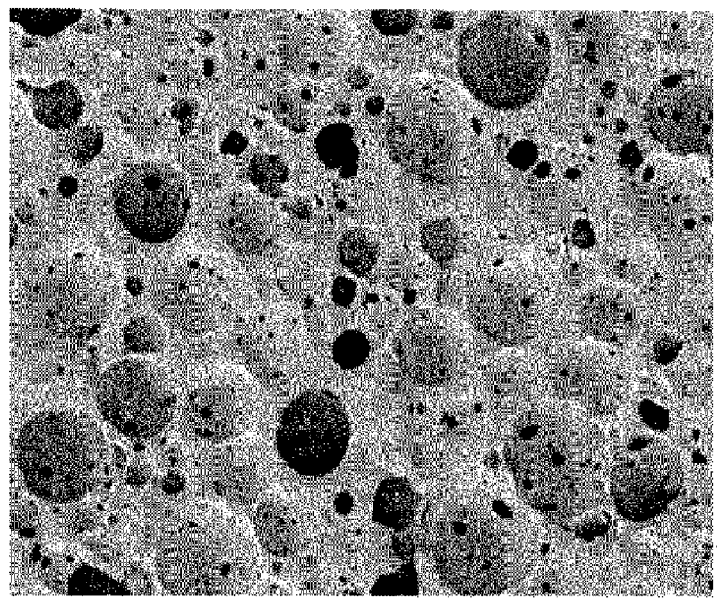
[FIG. 1]
Figure 1:
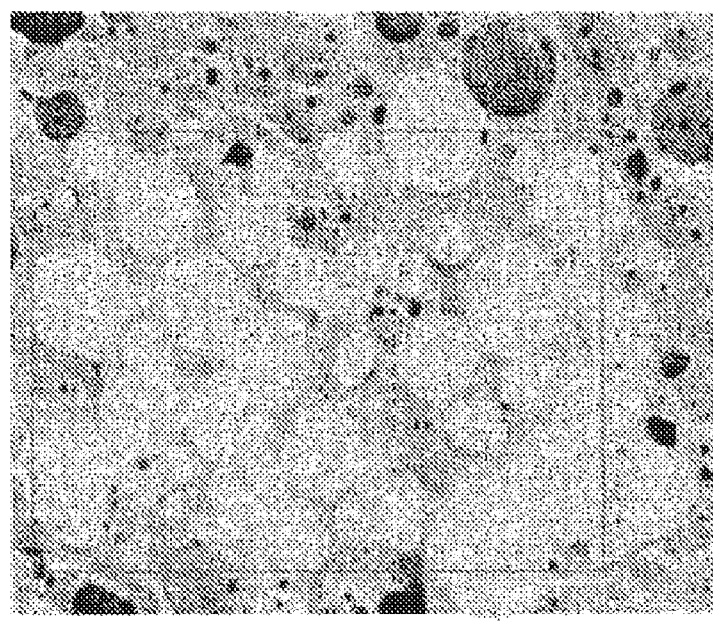
Figure 2:
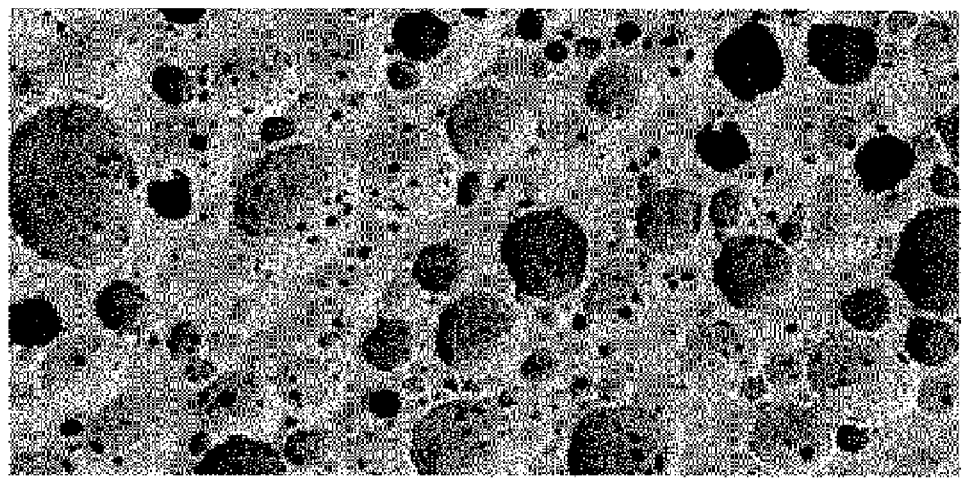
[FIG. 2]
Figure 2:
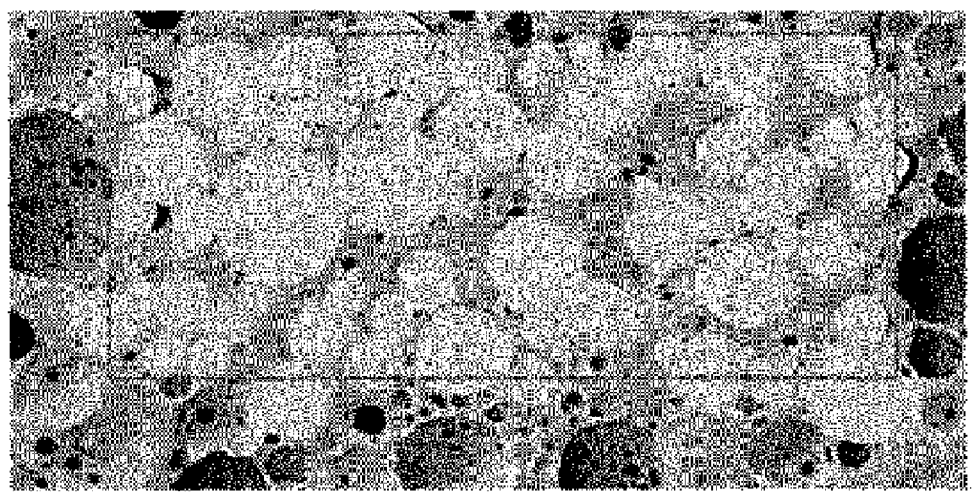
Figure 3:
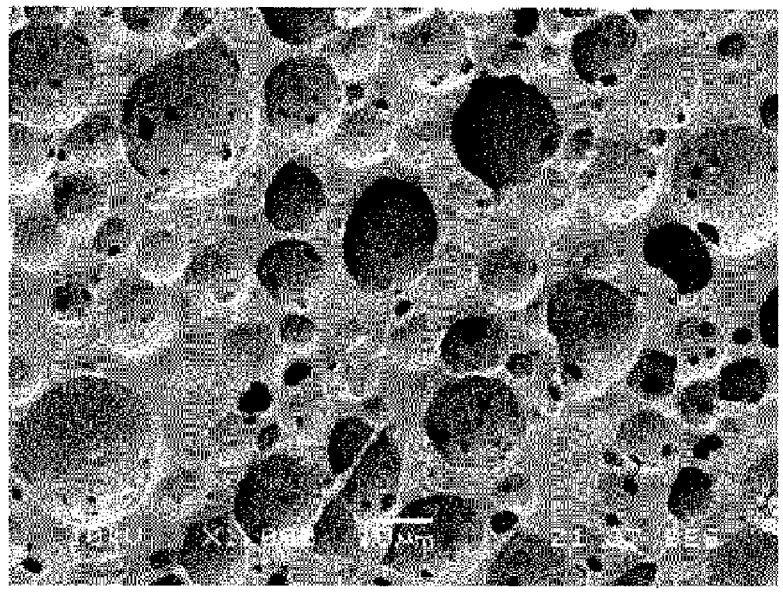
[FIG. 3]
Figure 3:
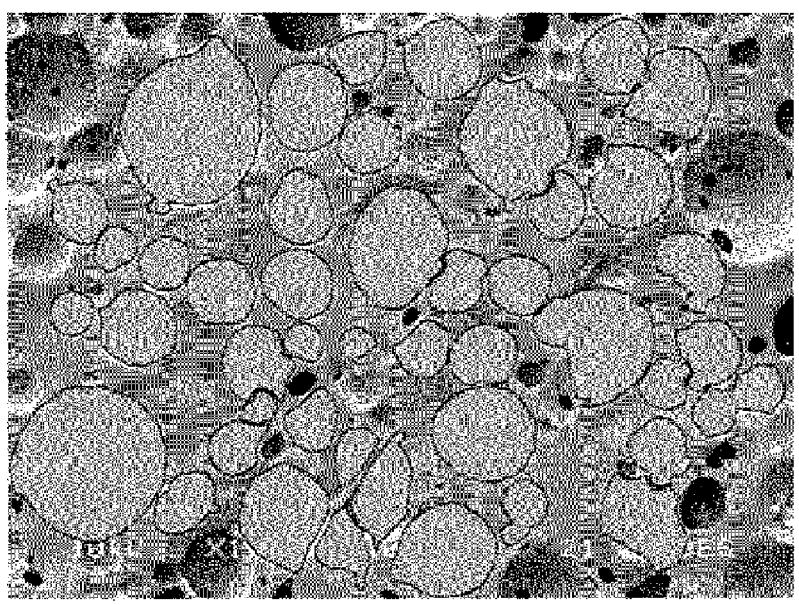
Figure 4:
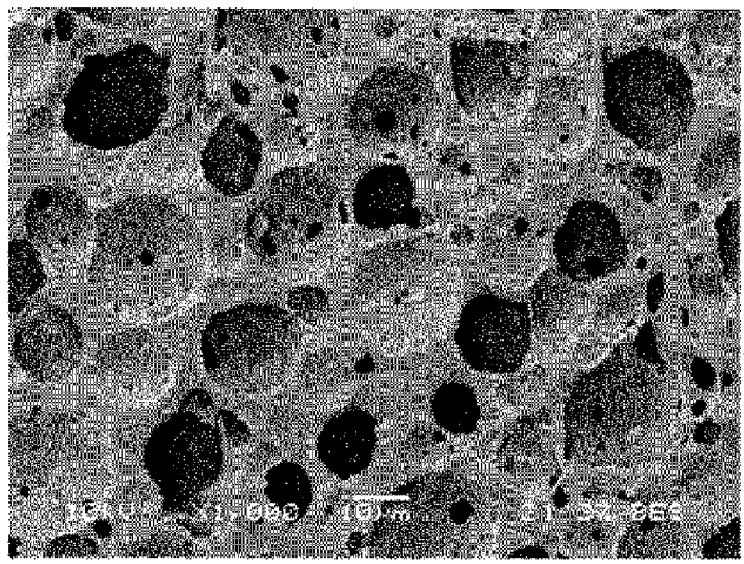
[FIG. 4]
Figure 4:
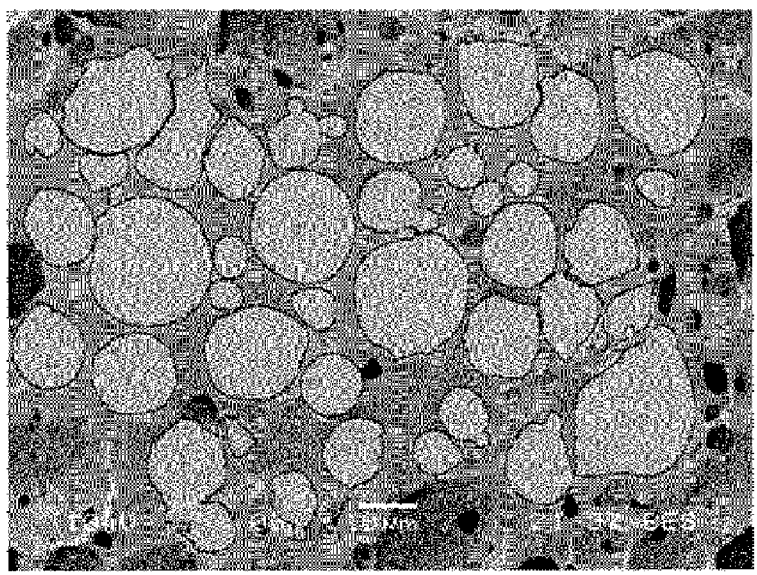
Figure 5:
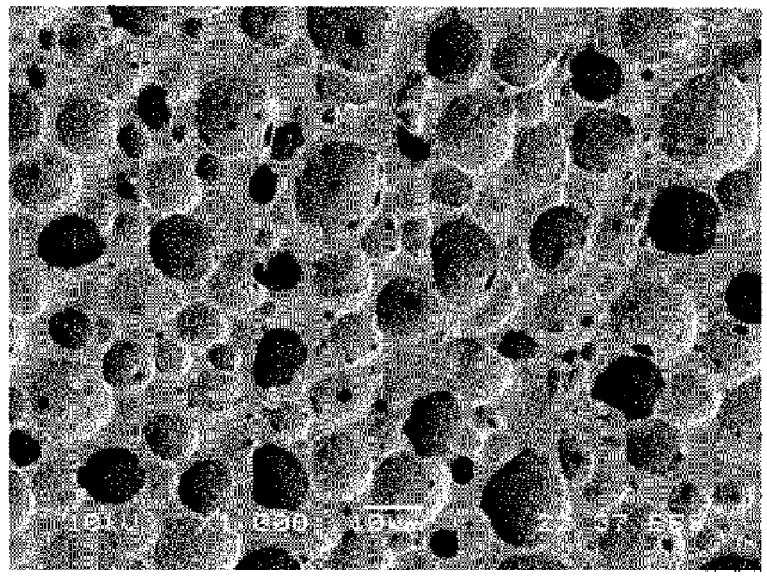
[FIG. 5]
Figure 5:
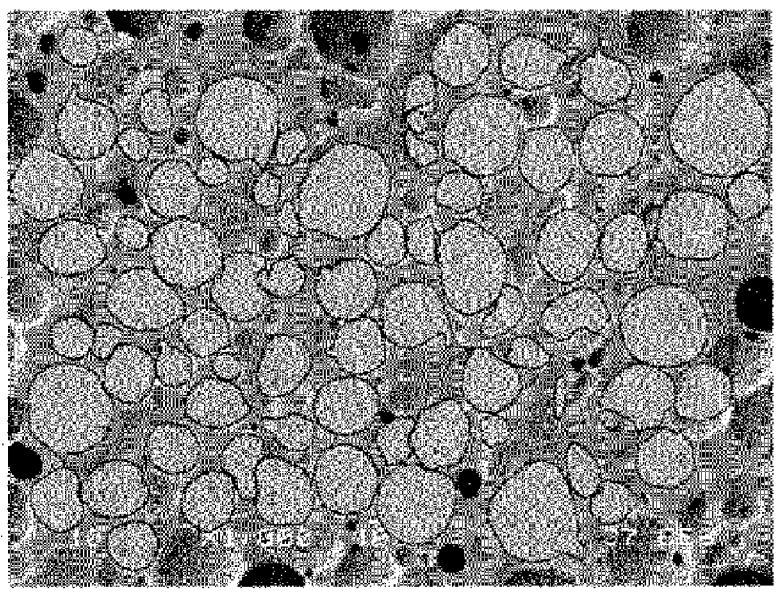
Figure 6:
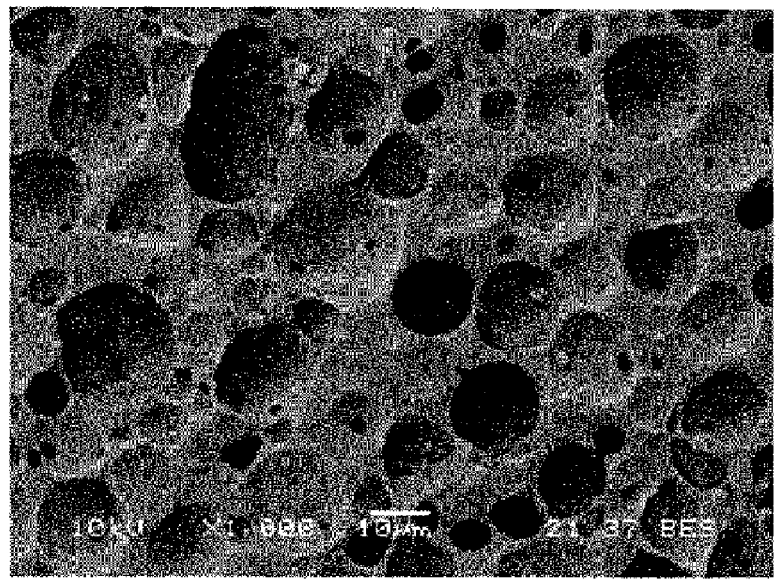
[FIG. 6]
Figure 6:
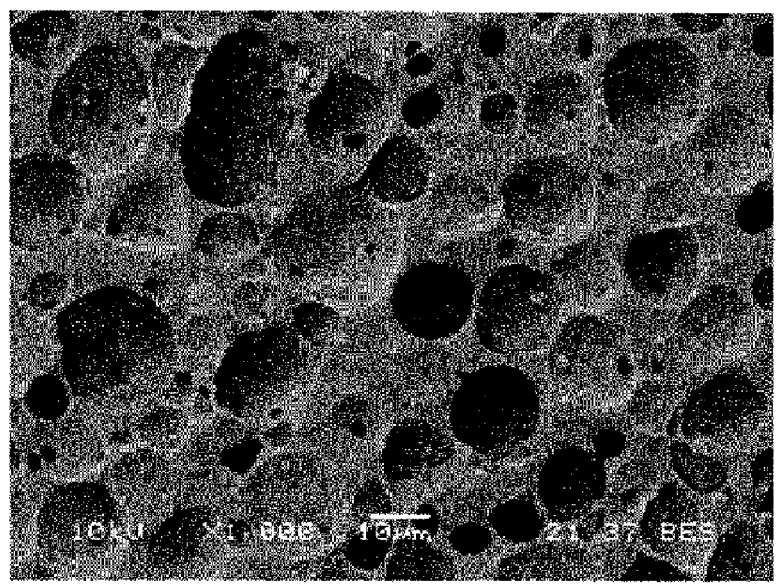
Figure 7:
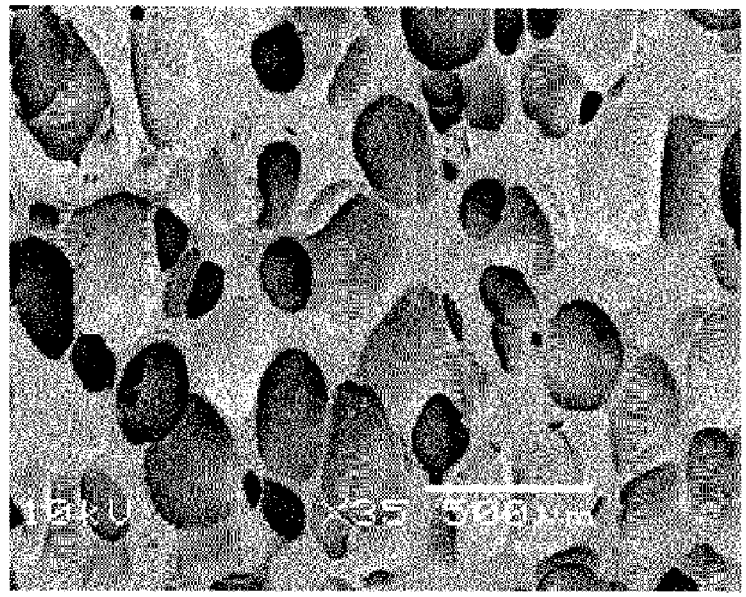
[FIG. 7]
Figure 7:
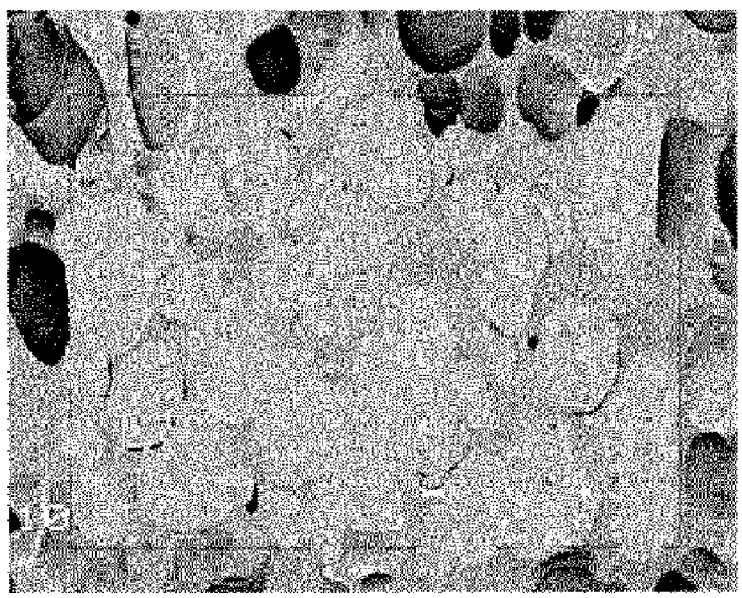
Figure 8:
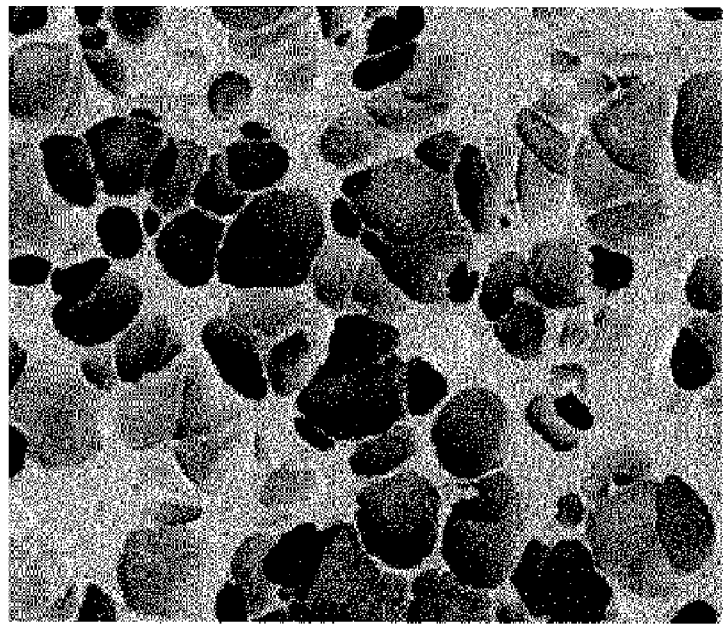
[FIG. 8]
Figure 8:
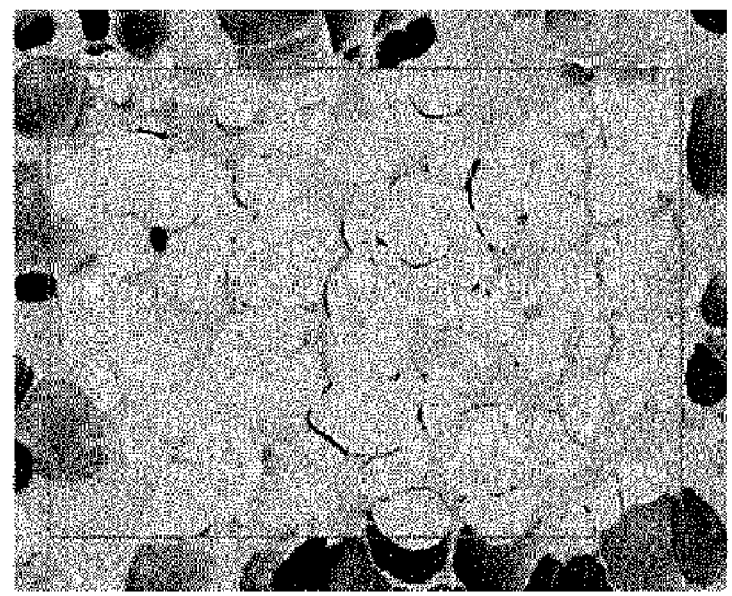
Figure 9:
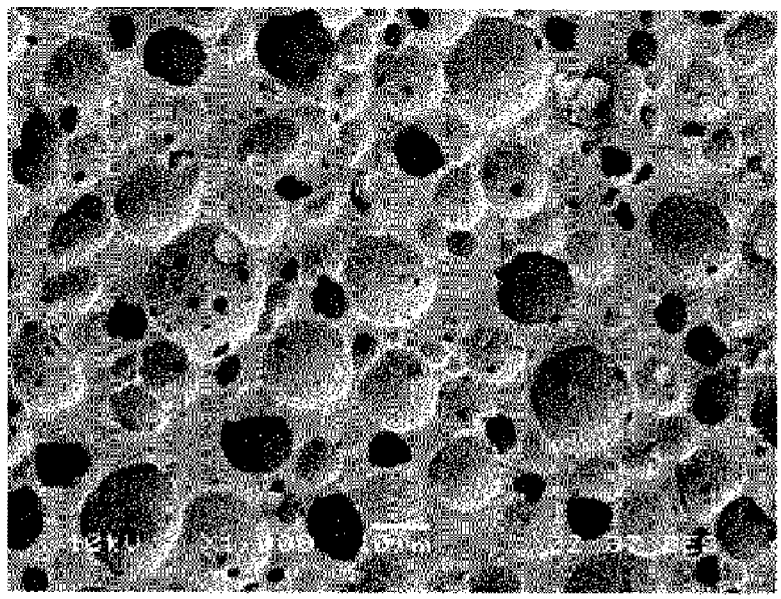
[FIG. 9]
Figure 9:
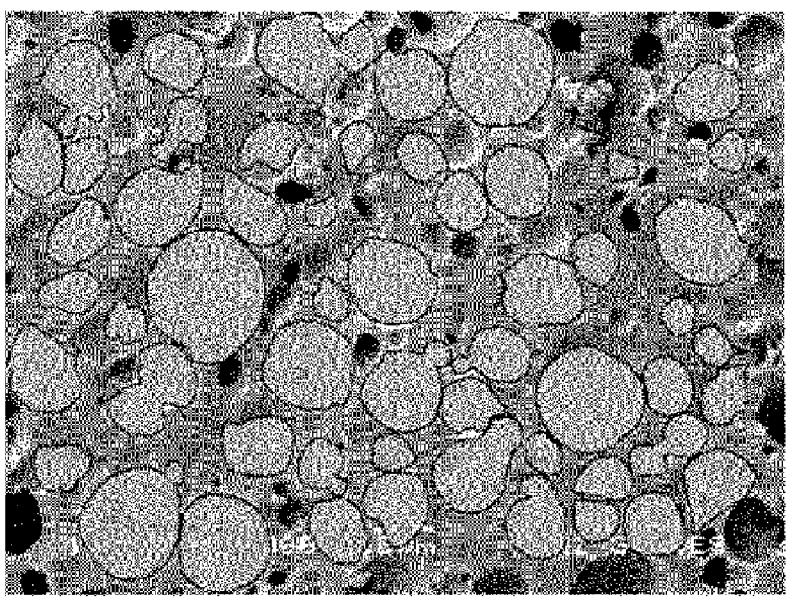
Figure 10:
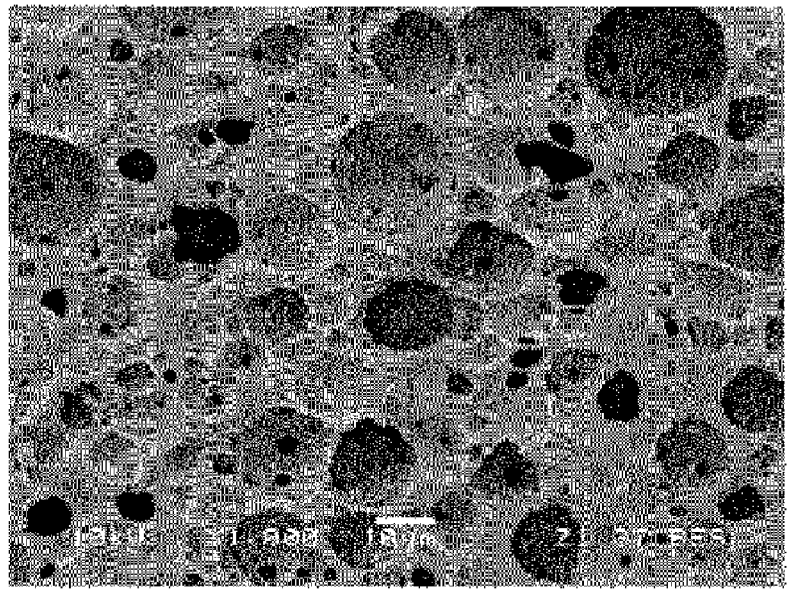
[FIG. 10]
Figure 10:
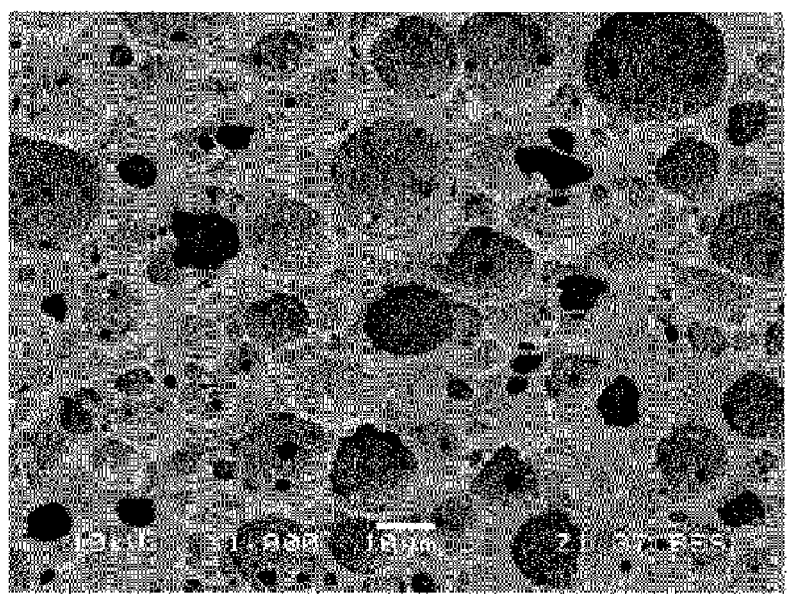
Figure 11:
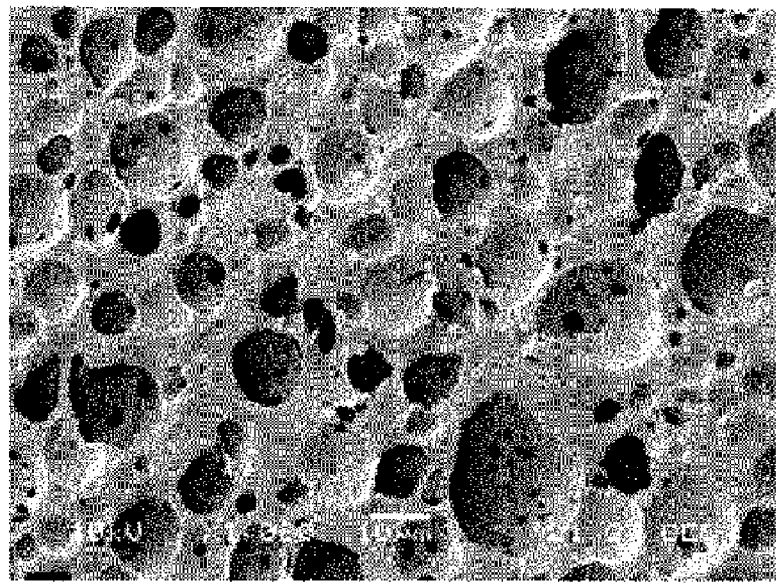
[FIG. 11]
Figure 11:
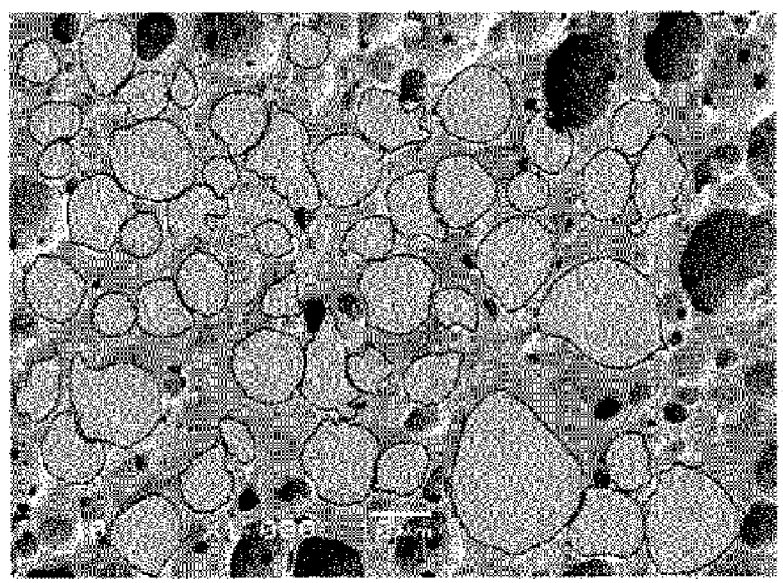
Figure 12:
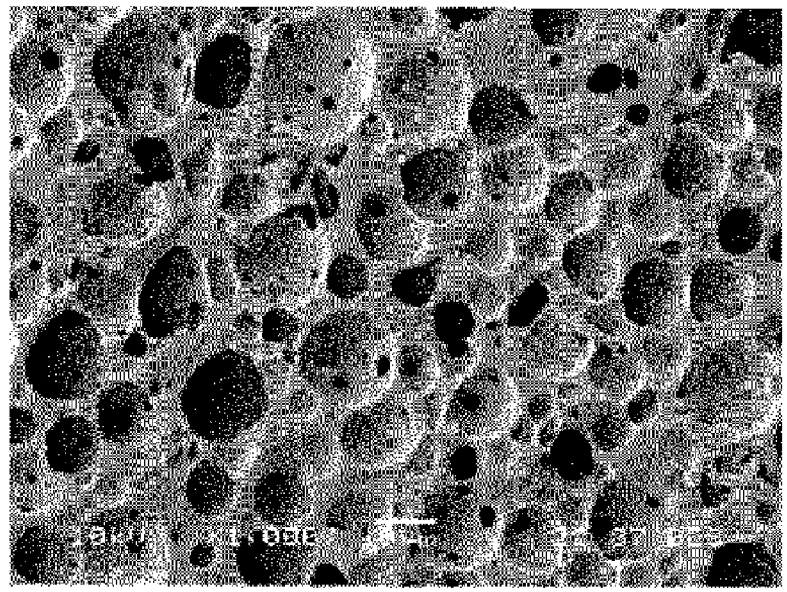
[FIG. 12]
Figure 12:
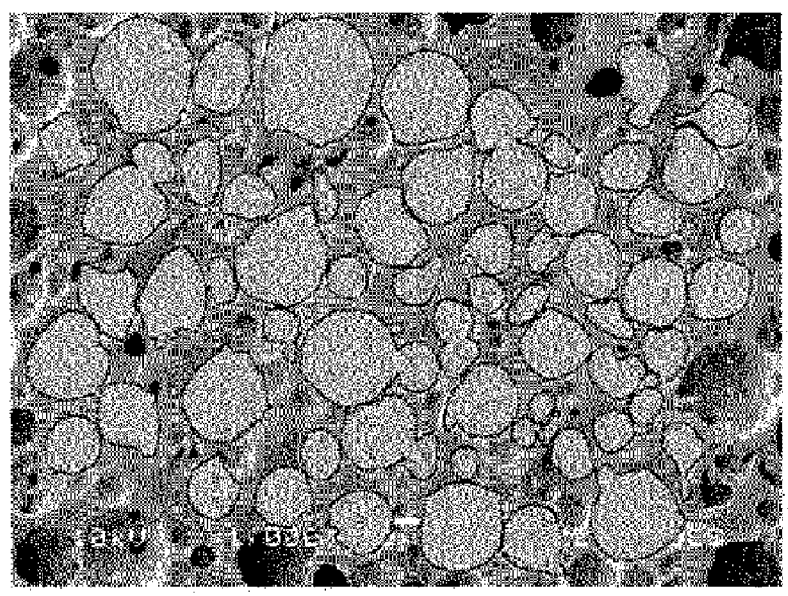

10: Belt fixing apparatus
21: Fixing roller
22: Pressure roller
23: Heating roller
24: Heat source
25: Fixing belt

DETAILED DESCRIPTION OF THE INVENTION

The elastomer porous material of the present invention is formed of an elastomer matrix and has numerous fine cells of substantially true spherical form distributed in the matrix.

Examples of the elastomer forming the matrix include silicone, urethane, chloroprene, ethylene-propylene copolymer (EPM), ethylene-propylene terpolymer (EPDM), styrene rubber (SBR), nitrile rubber (NBR), polyester elastomer, polyether elastomer, polyolefin elastomer, and epichlorohydrin rubber.

The elastomer porous material of the present invention is produced from an emulsion composition containing, as a continuous phase, a liquid rubber material which forms an elastomer. Specifically, the elastomer porous material is produced through the following procedure: the liquid rubber material (i.e., the continuous phase of the emulsion composition) is cured while the composition is maintained in an emulsion state, to thereby form an elastomer matrix, and subsequently the dispersion phase is removed to form cells. The thus-formed cells present in the porous material are substantially independent of one another. When the emulsion composition is prepared under reduced pressure so as to remove bubbles contained in the composition, the resultant porous material has only cells formed by removal of the dispersion phase; i.e., the porous material has substantially true spherical cells.

More specifically, the elastomer porous material having only substantially true spherical cells is produced by removing cells attributed to bubbles entrained in the emulsion composition. Most of the cells attributed to bubbles entrained in the emulsion composition have a diameter falling outside the range of the normal distribution of that of cells attributed to the emulsion (e.g., a diameter of 50 to 60 μm). When the cells attributed to such bubbles are precisely observed, the cells are not in a true spherical form, but in a considerably flattened form. The present inventors have found that such considerable flattening of the cells, which may occur upon curing of the elastomer, causes deterioration of properties (in particular, durability) of the elastomer porous material.

The elastomer porous material of the present invention can be confirmed to have only substantially true spherical cells by observing not one certain cross section, but two orthogonal cross sections. Cells confirmed to be in a true circular form in the two orthogonal cross sections are also in a true circular form in another cross section orthogonal to these two cross sections.

In the present invention, cells observed in an observation cross section are confirmed to have a true circular form and smooth surfaces with no irregularities by determining that, in the observation cross section, cells having a shape factor SF2—which indicates the remoteness from complete roundness and is represented by the following formula in terms of the area A of each cell and the perimeter length P thereof—of 130 or less account for 80% or more of all cells.

$$SF2 = \frac{P^2}{4\pi A} \times 100 \quad [F3]$$

Specifically, in the elastomer porous material of the present invention, when cells in a first observation region of a first cross section are observed at a certain magnification, cells having a shape factor SF2—which indicates the remoteness from complete roundness and is represented by the aforementioned formula in terms of the area A of each cell, and the perimeter length P thereof—of 130 or less account for 80% or more of all cells in the first observation region, and, when cells in a second observation region of a second cross section orthogonal to the first cross section are observed at a certain magnification, cells having a shape factor SF2—which indicates the remoteness from complete roundness and is represented by the aforementioned formula in terms of the area A of each cell, and the perimeter length P thereof—of 130 or less account for 80% or more of all cells in the second observation region.

For determination of the shape factor SF2, the two orthogonal cross sections are observed under an SEM, and each of the first and second observation regions is determined so that, for example, 40 to 80 cells are observed in the region. The shape factor SF2 is determined by measuring the area A of each cell and the perimeter length P thereof. Whether or not the cells in each of the observation regions satisfy the aforementioned requirements are determined on the basis of the thus-obtained shape factor SF2.

Such a process may be carried out through analysis of SEM image data input into a computer by means of, for example, image analysis software.

When the aforementioned requirement (in relation to the shape factor SF2) is satisfied in any one of the first and second observation regions, it is enough to confirm that the elastomer porous material of the present invention has the aforementioned cells. However, the elastomer porous material can be reliably confirmed to have substantially true spherical cells by determining that the requirement is satisfied in both the first and second observation regions.

Each of the first and second observation regions may be determined so that, for example, about 40 to about 80 cells are present in the observation region. Each of the observation regions may be the entire field of view of SEM, or a certain region in the field of view.

The elastomer porous material of the present invention can be confirmed to have substantially true spherical cells by determining that, in a cross section, cells having an aspect ratio a/b, wherein a represents the maximum diameter of each cell and b represents the length of the minor axis of that cell as measured in a direction orthogonal thereto, of 1.3 or less account for 70% or more of all cells.

Specifically, in the elastomer porous material of the present invention, preferably, when cells in a first observation region of a first cross section are observed at a certain magnification, cells having an aspect ratio a/b, wherein a represents the maximum diameter of each cell and b represents the length of the minor axis of that cell as measured in a direction orthogonal thereto, of 1.3 or less account for 70% or more of all cells in the first observation region, and, when cells in a second observation region of a second cross section orthogonal to the first cross section are observed at a certain magnification, cells having an aspect ratio a/b, wherein a represents the maximum diameter of each cell and b represents the length of the minor axis of that cell as measured in a direction orthogonal thereto, of 1.3 or less account for 70% or more of all cells in the second observation region.

For determination of the aspect ratio, similar to the case of the shape factor SF2, the two orthogonal cross sections are observed under an SEM, and each of the first and second observation regions is determined so that, for example, 40 to 80 cells are observed in the region. The aspect ratio a/b is determined by measuring the length of major axis a of each cell representing its maximum diameter of each cell and the length b of the miner axis of that cell in a direction orthogonal thereto. Whether or not the cells in each of the observation regions satisfy the aforementioned requirements can be determined on the basis of the thus-obtained aspect ratio a/b.

Similar to the case of the shape factor SF2, measurement of the length of major axis a and the length b of each cell may be carried out through analysis of SEM image data input into a computer by means of, for example, image analysis software.

As described in the previous patent application by the present applicant (Japanese Patent Application Laid-Open (kokai) No. 2005-206784), when cells are observed in a cross section, and cells satisfying the requirement represented by the below-described relation (A) or (B) account for 50% of all cells in the cross section, the cells are regarded as being in a true spherical form. However, this is insufficient to indicate that the cells are in a true spherical form, since the cells are observed in only one cross section. The requirement represented by the below-described relation (B) corresponds to the aspect ratio employed in the present invention, and "0.5" shown in relation (B) corresponds to an aspect ratio of 1.5. In the present invention, cells are observed in two orthogonal cross sections, and cells satisfying more stringent requirements than the requirements represented by these relations are regarded as being in a true spherical form.

$$0 \leq (m-n)/m \leq 0.5 \quad (A)$$

$$0 \leq (m-n)/n \leq 0.5 \quad (B)$$

(wherein m represents the length of major axis of a cell, and n represents the length of minor axis of the cell).

Also, the elastomer porous material of the present invention can be confirmed to have substantially true spherical cells by determining that, in each of the first and second observation regions, cells having a shape factor SF1—which indicates the roundness of a circle and is represented by the following formula in terms of the length of major axis a of each cell and the area A thereof—of 150 or less account for 80% or more of all cells.

$$SF1 = \frac{\pi a^2}{4A} \times 100 \quad [F4]$$

In the entirety of the elastomer porous material of the present invention, cells of uniform size are distributed uniformly. Therefore, observation of any cross section of the porous material provides results similar to those as described above.

The elastomer porous material of the present invention has numerous very fine cells which are densely distributed. Therefore, the number of cells per unit area in the elastomer porous material greatly differs from that in a conventional porous material produced through, for example, chemical foaming and having a porosity comparable to that of the elastomer porous material. The elastomer porous material of the present invention exhibits a porosity of, for example, 30% or more, preferably 40% or more. In the elastomer porous material, the number of cells per mm$^2$ is 200 or more, preferably 1,000 or more, more preferably 2,000 or more.

Next will be described the elastomer porous material of the present invention and a production method therefor by taking, as an example, the case of a silicone elastomer porous material.

The silicone elastomer porous material may be basically produced from a water-in-oil emulsion which contains a liquid silicone rubber material that forms a silicone elastomer through curing, and contains, as a dispersion phase, water or a mixture of water and an aqueous solvent (e.g., alcohol). In this case, the liquid silicone rubber material (preferably, a liquid silicone rubber material having low viscosity) and water may be thoroughly stirred under reduced pressure to form an emulsion, which may be immediately followed by heating for curing.

The silicone elastomer porous material of the present invention may be suitably produced from a water-in-oil emulsion which contains a liquid silicone rubber material that forms a silicone elastomer through curing, water, and a silicone oil material having interfacial activity, and which is produced under reduced pressure.

No particular limitation is imposed on the liquid silicone rubber material, so long as it forms a silicone elastomer through curing under heating. However, the liquid silicone rubber material employed is preferably a so-called addition-reaction-curable liquid silicone rubber material.

As described above, the elastomer porous material of the present invention has substantially true spherical cells. For production of the elastomer porous material, an emulsion composition must be prepared under reduced pressure. As used herein, "preparation of an emulsion composition under reduced pressure" refers to the case where a process of preparing an emulsion through mixing and stirring of raw materials is carried out under reduced pressure. Thus, even when an emulsion composition prepared at ambient pressure is subjected to degassing under reduced pressure, satisfactory effects are not obtained.

In the present invention, the liquid silicone rubber material employed may be a commercially available one. For example, in the case of a commercially available addition-reaction-curable liquid silicone rubber material, an unsaturated-aliphatic-group-containing—polysiloxane and an active-hydrogen-containing polysiloxane which form the silicone rubber material—are provided in separate packages, and a curing catalyst required for curing both the polysiloxanes, which will be described in detail hereinbelow, is included in the unsaturated-aliphatic-group-containing polysiloxane package. Needless to say, two or more liquid silicone rubber materials may be employed in combination.

The silicone oil material having interfacial activity serves as a dispersion stabilizer for stably dispersing water in an emulsion. Thus, the silicone oil material having interfacial activity exhibits affinity for both water and the liquid silicone rubber material.

Needless to say, in the aforementioned water-in-oil emulsion, water is dispersed in the form of particles (droplets) as a discontinuous phase (dispersed phase). As described in detail hereinbelow, the diameter of water particles substantially determines the diameter of cells (pores) of the silicone elastomer porous material of the present invention.

From the viewpoint of production of a water-in-oil emulsion exhibiting particularly excellent water dispersion stability, preferably, the silicone oil material having interfacial activity and water are employed in amounts of 0.2 to 10 parts by weight and 10 to 250 parts by weight, respectively, on the basis of 100 parts by weight of the liquid silicone rubber material. When such an emulsion exhibiting excellent water dispersion stability is employed, a good porous material can be further reliably produced. Needless to say, two or more silicone oil materials having interfacial activity may be employed in combination.

When a liquid rubber material other than silicone is employed, the emulsion composition may be an emulsion containing, as a continuous phase, the liquid rubber material and, as a dispersed phase, a solvent which can be phase-separated from the continuous phase, and optionally containing a surfactant or a substance having interfacial activity.

The elastomer porous material of the present invention may contain, in consideration of the intended use thereof, a variety of additives. Examples of such an additive include a colorant (e.g., a pigment or a dye), a conductivity-imparting material (e.g., carbon black or metal powder), and a filler (e.g., silica).

The emulsion composition employed in the present invention may be produced through various methods. For example, a water-in-oil emulsion composition containing a silicone elastomer may be generally produced by mixing a liquid silicone rubber material, a silicone oil material having interfacial activity, and water, and optionally an additive under reduced pressure, and by thoroughly stirring the resultant mixture. For preparation of the emulsion composition, no particular limitation is imposed on the order of addition of the respective materials, as well as the method for mixing the materials, and the respective materials may be added sequentially, or mixtures each containing a plurality of materials may be mixed together.

As used herein, "reduced pressure" refers to, for example, −30 kPa or less, preferably −60 kPa or less (lower limit: about −100 kPa).

Instead of mixing/stirring under reduced pressure, the respective raw materials may be degassed in advance, and then the materials may be stirred so that they are not exposed to a gas (e.g., air), to thereby prepare an emulsion.

For production of the elastomer porous material from the emulsion composition, the emulsion composition is subjected to primary heating (for curing) in the presence of an optional curing catalyst so that components of the composition are not evaporated, and subsequently the resultant composition is subjected to secondary heating for liquid removal and complete curing.

For production of the silicone elastomer porous material, firstly, the emulsion composition is subjected to primary heating. The primary heating is preferably carried out at 130° C. or lower for heating and curing the liquid silicone rubber material without evaporation of water contained in the emulsion composition. The primary heating temperature is generally 80° C. or higher, and the heating time is generally about 5 minutes to about 60 minutes. Through this primary heating, the liquid silicone rubber material is cured, and water particles remain in the cured rubber material in the form of being dispersed in the emulsion. The silicone rubber material is cured to such an extent that it can resist expansion force upon evaporation of water by secondary heating described below. Secondary heating is carried out for removing water from the cured silicone rubber material containing water particles. The secondary heating is preferably carried out at 70° C. to 300° C. When the heating temperature is lower than 70° C., removal of water requires a long period of time, whereas when the heating temperature exceeds 300° C., the cured silicone rubber material may be impaired. When the heating temperature is 70° C. to 300° C., removal of water (through evaporation) is completed by heating for 1 to 24 hours. Through this secondary heating, water is evaporated and removed, and eventual curing of the silicone rubber material is achieved. After removal of water through evaporation, cells having a diameter almost equal to that of water particles are formed in the cured silicone rubber material (silicone elastomer).

Thus, the elastomer porous material of the present invention can be produced from the emulsion composition without involving foaming action (e.g., chemical foaming). The dispersed phase (e.g., water particles) contained in the emulsion composition remains in the elastomer cured through the primary heating, and only evaporates upon the secondary heating.

The silicone elastomer porous material of the present invention can be employed in a variety of fields. For example, the porous material can be employed in components of image-forming devices (e.g., copying machines and laser printers), including a developing roller, a toner-feeding roller, a transfer roller, and a cleaning roller. Also, the silicone elastomer porous material can be employed in paper-sheet-feeding rollers of copying machines, various types of printers, and plotters, as well as in fixing components (e.g., a fixing roller and a pressure roller). All of these rollers have basically the same structure, in which an elastic layer formed of the silicone elastomer porous material of the present invention is provided around a core bar. The thickness of the elastic layer, which may vary depending on the type of the roller, is generally about 0.1 mm to about 15 mm, and the length of the elastic layer is generally up to 400 mm. The outer diameter of the core bar, which may also vary depending on the type of the roller, is generally about 5 mm to about 50 mm.

EXAMPLES

Example 1

As described below, a water-in-oil emulsion composition was prepared by carrying out mixing and stirring under reduced pressure (−98 kPa) in a reduced-pressure stirring apparatus.

A filler (5 parts by weight) and a silicone oil having interfacial activity (5 parts by weight) were added to and mixed with liquid silicone rubber (trade name: DY35-7002, obtained from Dow Corning Toray Co., Ltd.) (100 parts by weight) serving as a liquid silicone rubber material, and the mixture was stirred. Subsequently, water (140 parts by weight) was gradually added to the resultant mixture under stirring, to thereby prepare a water-in-oil emulsion composition.

The resultant emulsion was added to a die containing an iron core bar having a length of a surface on which rubber is applied (hereinafter may be referred to as a "rubber surface length") of 310 mm and an outer diameter φ of 20 mm, and heating (primary heating) was carried out at 130° C. for 40 minutes, to thereby form a molded product. The molded product (porous material precursor) was subjected to heating (secondary heating) in an electric furnace at 200° C. for six hours, to thereby remove water. Thereafter, polishing was carried out, to thereby produce a roller having an outer diameter φ of 35 mm and a hardness (Asker C) of 40°.

Example 2

As described below, a water-in-oil emulsion composition was prepared by carrying out mixing and stirring under reduced pressure (−60 kPa) in a reduced-pressure stirring apparatus.

A filler (5 parts by weight) and a silicone oil having interfacial activity (5 parts by weight) were added to and mixed with liquid silicone rubber (trade name: DY35-7002, obtained from Dow Corning Toray Co., Ltd.) (100 parts by weight) serving as a liquid silicone rubber material, and the mixture was stirred. Subsequently, water (140 parts by weight) was gradually added to the resultant mixture under stirring, to thereby prepare a water-in-oil emulsion composition.

Subsequent processes were carried out in a manner similar to that of Example 1, to thereby produce a roller having an outer diameter φ of 35 mm and a hardness (Asker C) of 40°.

Example 3

As described below, a water-in-oil emulsion composition was prepared by carrying out mixing and stirring under reduced pressure (−30 kPa) in a reduced-pressure stirring apparatus.

A filler (5 parts by weight) and a silicone oil having interfacial activity (5 parts by weight) were added to and mixed with liquid silicone rubber (trade name: DY35-7002, obtained from Dow Corning Toray Co., Ltd.) (100 parts by weight) serving as a liquid silicone rubber material, and the mixture was stirred. Subsequently, water (140 parts by weight) was gradually added to the resultant mixture under stirring, to thereby prepare a water-in-oil emulsion composition.

Subsequent processes were carried out in a manner similar to that of Example 1, to thereby produce a roller having an outer diameter φ of 35 mm and a hardness (Asker C) of 40°.

Comparative Example 1

In Comparative Example 1, a roller having an outer diameter φ of 35 mm and a hardness (Asker C) of 40° was produced from a silicone elastomer porous material (produced by kneading Silicone Rubber KE-951U (product of Shin-Etsu Chemical Co., Ltd.) with a vulcanizing agent compatible therewith and a chemical foaming agent, followed by foaming).

Comparative Example 2

A filler (5 parts by weight) and a silicone oil having interfacial activity (5 parts by weight) were mixed with liquid silicone rubber (trade name: DY35-7002, obtained from Dow Corning Toray Co., Ltd.) (100 parts by weight) serving as a liquid silicone rubber material, and the mixture was stirred by means of a hand mixer. Subsequently, water (140 parts by weight) was gradually added to the resultant mixture under stirring, to thereby prepare a water-in-oil emulsion composition.

The resultant emulsion was defoamed in a pressure reducer, to thereby remove air contained in the emulsion. Subsequently, the emulsion was added to a die containing an iron core bar having a rubber surface length of 310 mm and an outer diameter of 20 mm, and heating (primary heating) was carried out at 130° C. for 40 minutes, to thereby form a molded product. The molded product (porous material precursor) was subjected to heating (secondary heating) in an electric furnace at 200° C. for six hours, to thereby remove water. Thereafter, polishing was carried out, to thereby produce a roller having an outer diameter φ of 35 mm and a hardness (Asker C) of 40°.

Comparative Example 3

As described below, a water-in-oil emulsion composition was prepared by carrying out mixing and stirring under reduced pressure (−20 kPa) in a reduced-pressure stirring apparatus.

A filler (5 parts by weight) and a silicone oil having interfacial activity (5 parts by weight) were added to and mixed with liquid silicone rubber (trade name: DY35-7002, obtained from Dow Corning Toray Co., Ltd.) (100 parts by weight) serving as a liquid silicone rubber material, and the mixture was stirred. Subsequently, water (140 parts by weight) was gradually added to the resultant mixture under stirring, to thereby prepare a water-in-oil emulsion composition.

Subsequent processes were carried out in a manner similar to that of Comparative Example 2, to thereby produce a roller having an outer diameter φ of 35 mm and a hardness (Asker C) of 40°.

Test Example 1

Each of the rollers of Examples 1 to 3 and Comparative Examples 1 to 3 was cut, in the vicinity of the center in an axial direction, in a radial direction and in a longitudinal direction orthogonal thereto. Each of the resultant cross sections was observed under an electron microscope (JSM 5600, product of JEOL Ltd.), and an image of the cross section including 40 to 80 cells was obtained (magnification: ×1,000 for Examples, ×100 for Comparative Examples). A certain rectangular region including cells whose entirety can be observed was determined in each of the cross-sectional images (a first observation region for the radial cross-sectional image and a second observation region for the longitudinal cross-sectional image). Cells included in the rectangular region (all cells on the boundary line were included in the region) were subjected to the below-described measurements. In this test, the first observation region was determined in the radial cross section, and the second observation region was determined in the longitudinal cross section. However, the first and second observation regions are not limited thereto, and may be determined in any orthogonal cross sections.

FIGS. 1 to 12 show SEM photographs of radial cross sections and first observation regions thereof, and SEM photographs of longitudinal cross sections and second observation regions thereof in Examples 1 to 3 and Comparative Examples 1 to 3.

The data of each cross-sectional image were input into Macrosoft lenaraf 200 operated in Microsoft Excel. A reference length was determined, and the circumference of each cell included in each observation region was traced, to thereby select points corresponding the contour of the cell. Aspect ratio, SF1, and SF2 were calculated through the below-described methods. The results are shown in Table 1.

<Aspect Ratio>

For each cell, about 20 points were chosen on the perimeter thereof. On the basis of the thus-chosen points, the maximum diameter of each cell (length of major axis) a and the length b of minor axis orthogonal thereto were determined, to thereby calculate the aspect ratio a/b of the cell.

<SF1>

For each cell, about 20 points were chosen on the perimeter thereof. On the basis of the thus-chosen points, the maximum diameter of each cell (length of major axis) a was determined, and the area of the cell was determined by means of the software. SF1 was calculated from the thus-determined values. FIGS. 13 to 24 show histograms of SF1 in Examples 1 to 3 and Comparative Examples 1 to 3.

<SF2>

For each cell, about 20 points were chosen on the perimeter thereof. On the basis of the thus-chosen points, the perimeter length and area of the cell were determined by means of the software. SF2 was calculated from the thus-determined values. FIGS. 25 to 36 show histograms of SF2 in Examples 1 to 3 and Comparative Examples 1 to 3.

Test Example 2

Each of the cross-sectional images obtained in Test Example 1 was printed out, and the inside of each cell included in the first and second observation regions was painted with a black marker pen. The thus-painted image was scanned with a scanner, and the diameter and number of cells were determined by means of V10 for Windows (registered trademark) 95 (product of Toyobo Co., Ltd.). Definition was adjusted to 150 so that cells were well recognized by the software. Porosity was calculated on the basis of the ratio of the area of cells (average cell diameter×the number of cells) to that of the image. The number of cells per $mm^2$ was calculated by dividing the number of cells in the observation region by the area of the observation region. The results are shown in Table 1.

TABLE 1

|  |  | Example 1 | | Example 2 | | Example 3 | |
| --- | --- | --- | --- | --- | --- | --- | --- |
|  |  | First observation region | Second observation region | First observation region | Second observation region | First observation region | Second observation region |
| Number of cells counted | | 47 | 63 | 45 | 40 | 74 | 43 |
| Aspect ratio | Mean | 1.16 | 1.16 | 1.22 | 1.27 | 1.26 | 1.21 |
| | Cells of 1.3 or less [%] | 89 | 87 | 80 | 70 | 72 | 84 |
| | Cells of 1.2 or less [%] | 77 | 73 | 60 | 44 | 50 | 63 |
| | Cells of 1.1 or less [%] | 36 | 37 | 33 | 23 | 22 | 35 |
| SF1 | Mean | 121.82 | 119.72 | 139.18 | 141.16 | 138.11 | 131.87 |
| | Cells of 150 or less [%] | 94 | 90 | 83 | 80 | 81 | 85 |
| | Cells of 140 or less [%] | 87 | 86 | 64 | 64 | 70 | 79 |
| | Cells of 130 or less [%] | 77 | 78 | 51 | 54 | 55 | 65 |
| SF2 | Mean | 109.27 | 106.84 | 120.48 | 122.12 | 115.06 | 116.53 |
| | Cells of 130 or less [%] | 94 | 98 | 80 | 82 | 85 | 81 |
| | Cells of 120 or less [%] | 87 | 97 | 56 | 56 | 74 | 72 |
| | Cells of 110 or less [%] | 70 | 81 | 40 | 41 | 50 | 44 |

TABLE 1-continued

| Cell diameter | | | |
|---|---|---|---|
| | Mean [μm] | 10 | 9 |
| | Cells of 50 μm or less [%] | 100 | 100 |
| | Cells of 30 μm or less [%] | 100 | 99 |
| | Cells of 20 μm or less [%] | 94 | 97 |
| | Cells of 15 μm or less [%] | 79 | 88 |
| | Cells of 10 μm or less [%] | 56 | 65 |
| Number of cells/mm$^2$ | | 4884 | 6035 |
| Porosity [%] | | 37 | 34 |

| | | Comparative Example 1 | | Comparative Example 2 | | Comparative Example 3 | |
|---|---|---|---|---|---|---|---|
| | | First observation region | Second observation region | First observation region | Second observation region | First observation region | Second observation region |
| Number of cells counted | | 44 | 74 | 55 | 54 | 51 | 61 |
| Aspect ratio | Mean | 1.8 | 1.57 | 1.27 | 1.26 | 1.29 | 1.32 |
| | Cells of 1.3 or less [%] | 5 | 30 | 62 | 67 | 63 | 66 |
| | Cells of 1.2 or less [%] | 5 | 18 | 40 | 50 | 37 | 41 |
| | Cells of 1.1 or less [%] | 2 | 8 | 16 | 19 | 20 | 15 |
| SF1 | Mean | 201.04 | 177.77 | 144.89 | 143.26 | 147.94 | 148.43 |
| | Cells of 150 or less [%] | 20 | 31 | 64 | 69 | 69 | 69 |
| | Cells of 140 or less [%] | 9 | 23 | 47 | 56 | 47 | 59 |
| | Cells of 130 or less [%] | 5 | 18 | 38 | 37 | 37 | 48 |
| SF2 | Mean | 132.54 | 130.37 | 122.30 | 123.98 | 122.89 | 123.25 |
| | Cells of 130 or less [%] | 61 | 58 | 75 | 74 | 76 | 72 |
| | Cells of 120 or less [%] | 36 | 39 | 62 | 57 | 61 | 61 |
| | Cells of 110 or less [%] | 14 | 8 | 35 | 22 | 31 | 31 |
| Cell diameter | Mean [μm] | 193 | 160 | | | | |
| | Cells of 50 μm or less [%] | 0 | 0 | | | | |
| | Cells of 30 μm or less [%] | 0 | 0 | | | | |
| | Cells of 20 μm or less [%] | 0 | 0 | | | | |
| | Cells of 15 μm or less [%] | 0 | 0 | | | | |
| | Cells of 10 μm or less [%] | 0 | 0 | | | | |
| Number of cells/mm$^2$ | | 16 | 22 | | | | |
| Porosity [%] | | 47 | 44 | | | | |

(Summary of the Results)

Figure 13:
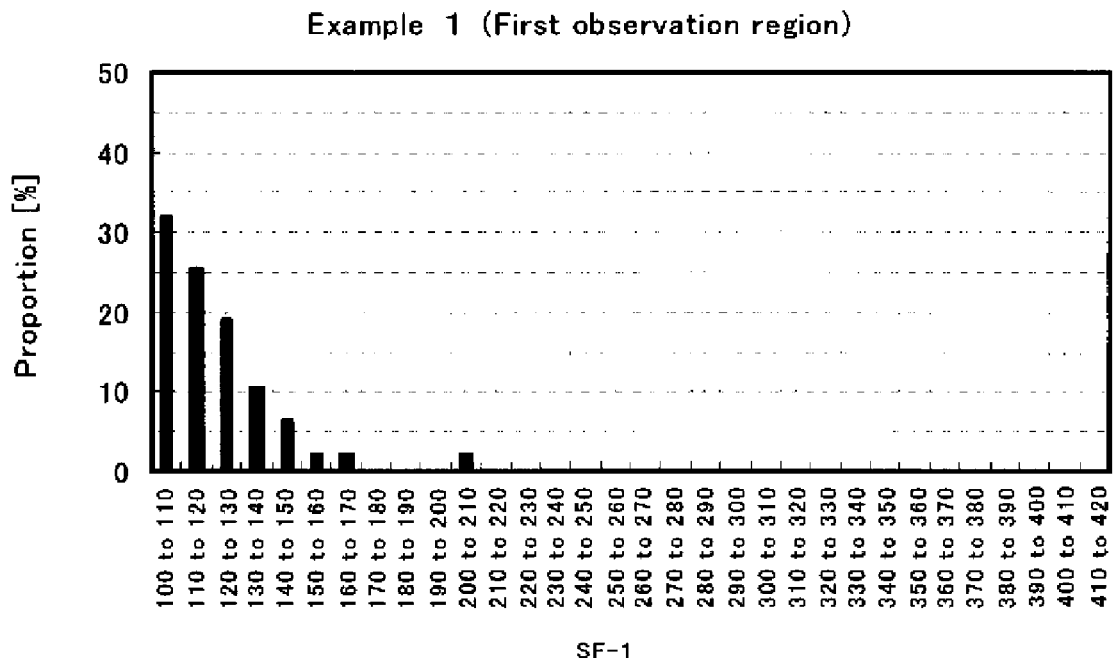
[FIG. 13]
Figure 14:
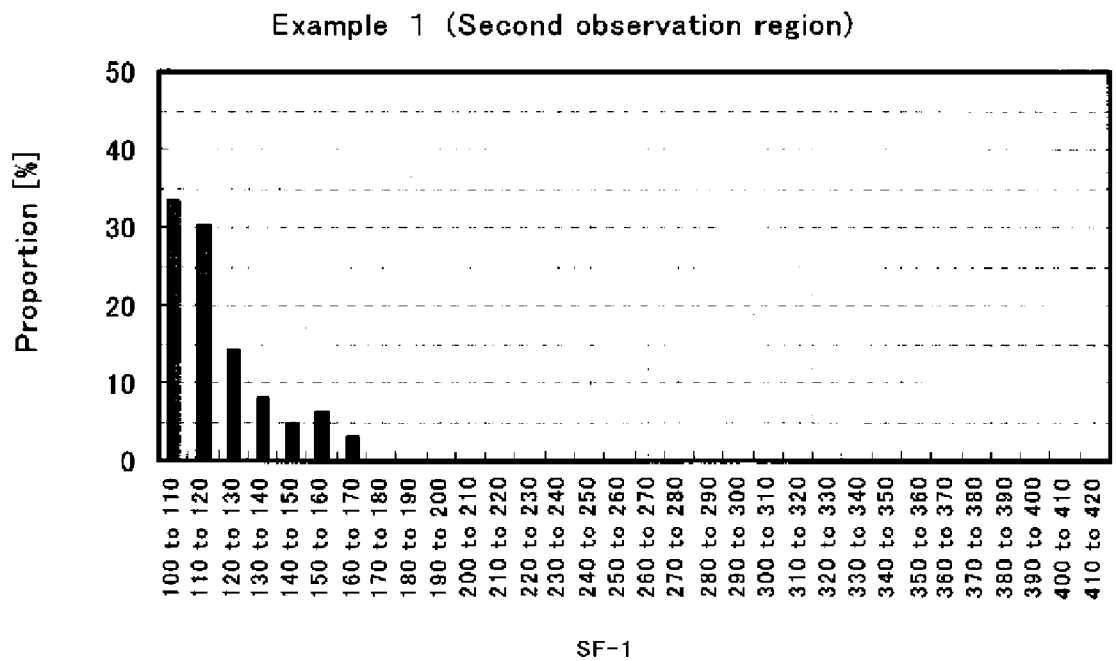
[FIG. 14]
Figure 15:
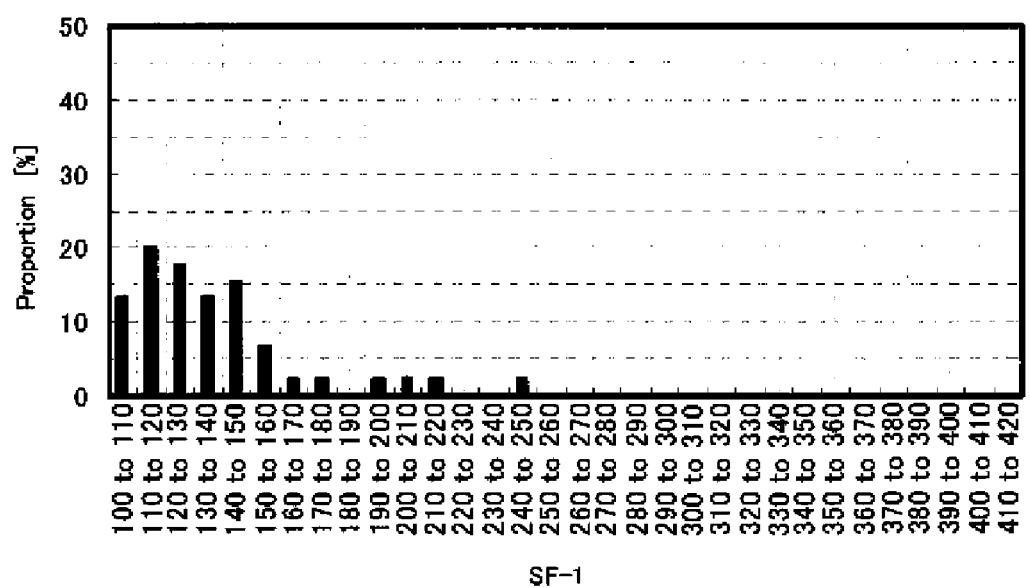
[FIG. 15]
Figure 16:
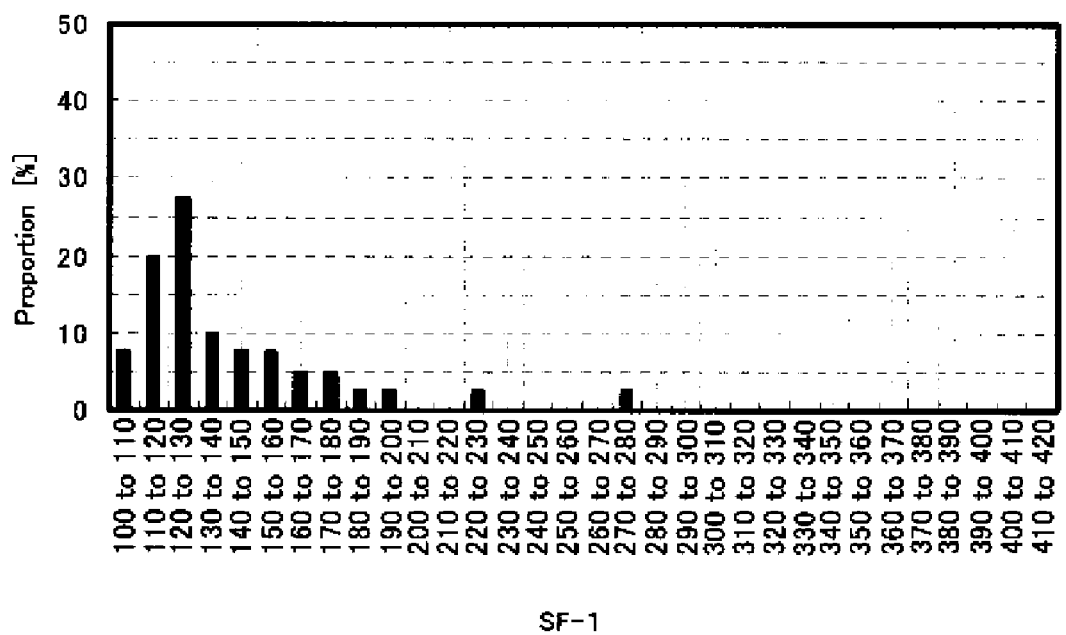
[FIG. 16]
Figure 17:
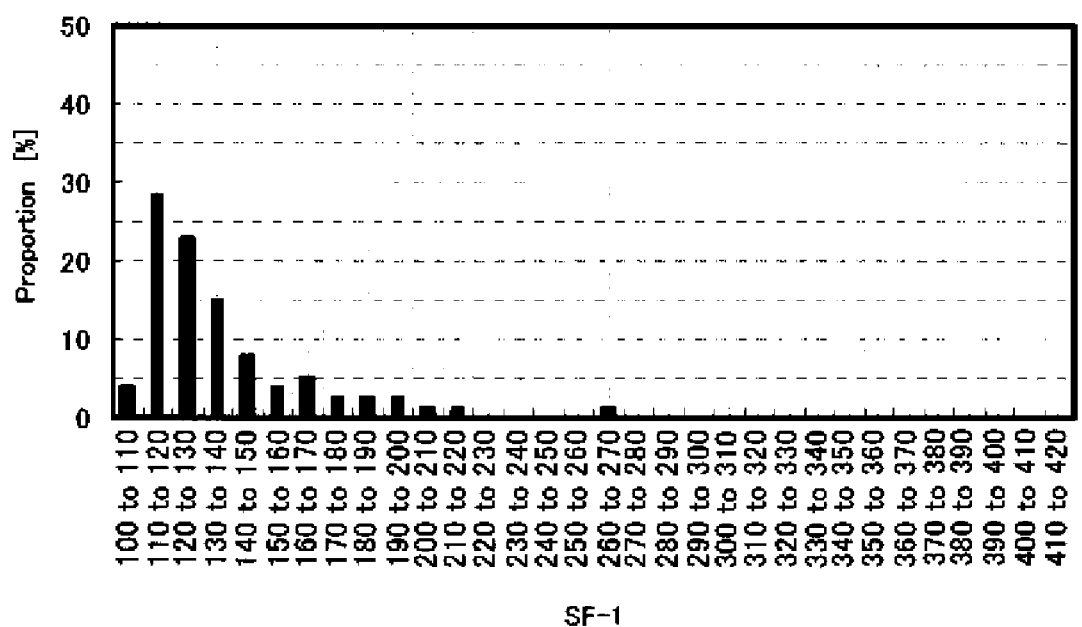
[FIG. 17]
Figure 18:
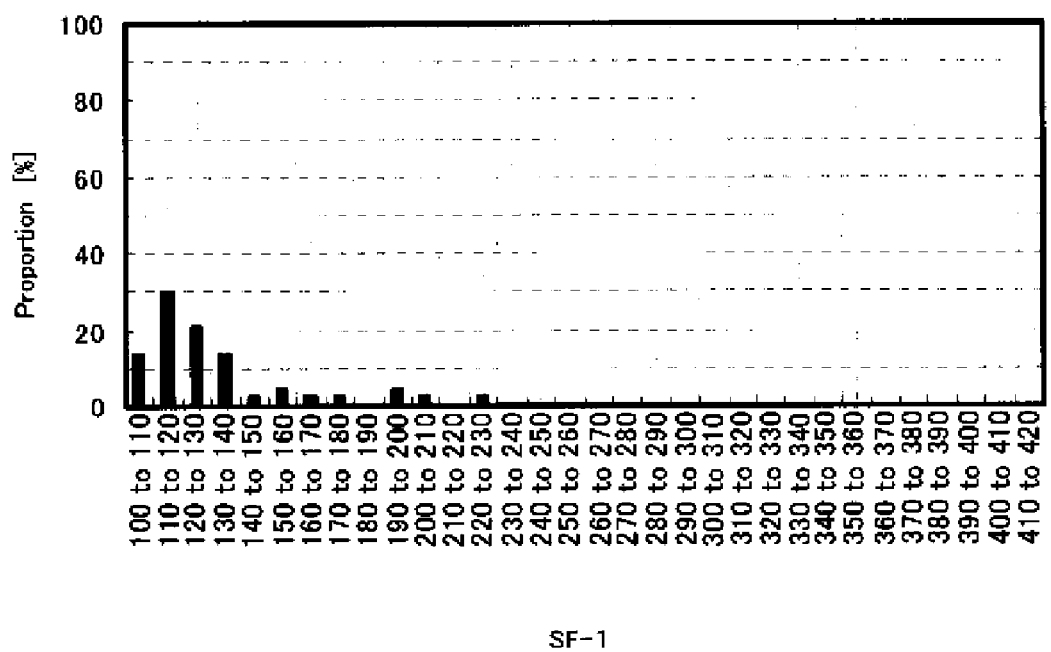
[FIG. 18]
Figure 25:
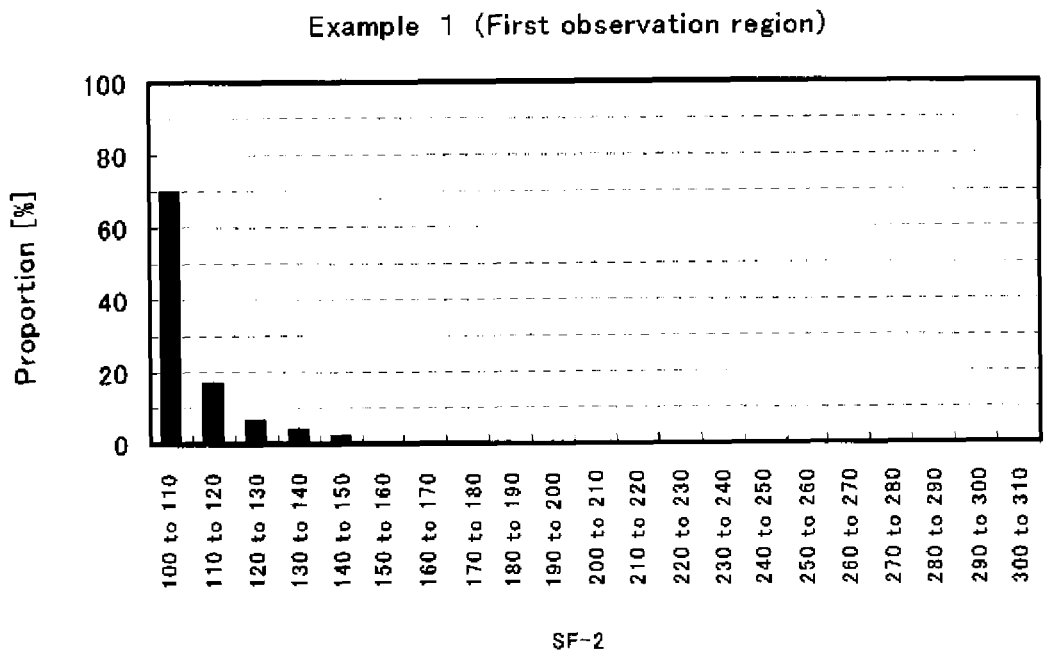
[FIG. 25]
Figure 26:
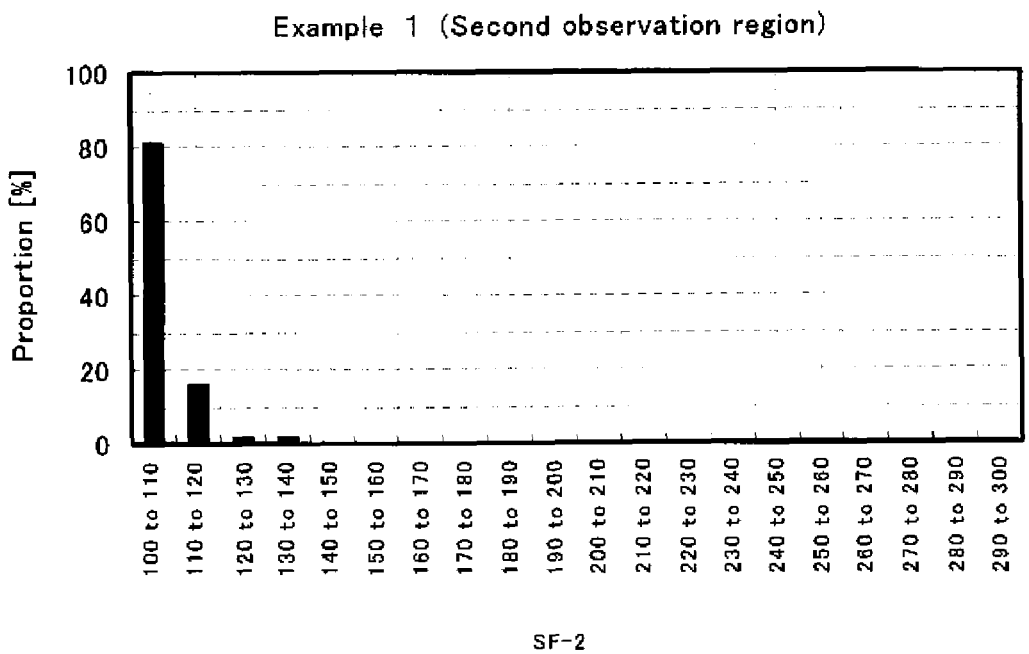
[FIG. 26]
Figure 27:
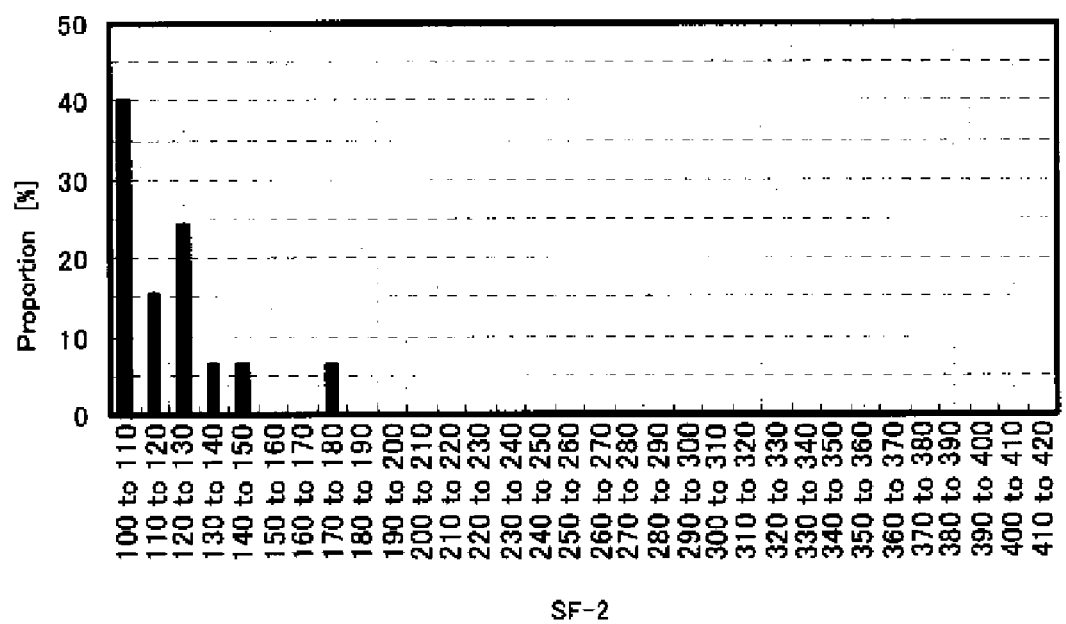
[FIG. 27]
Figure 28:
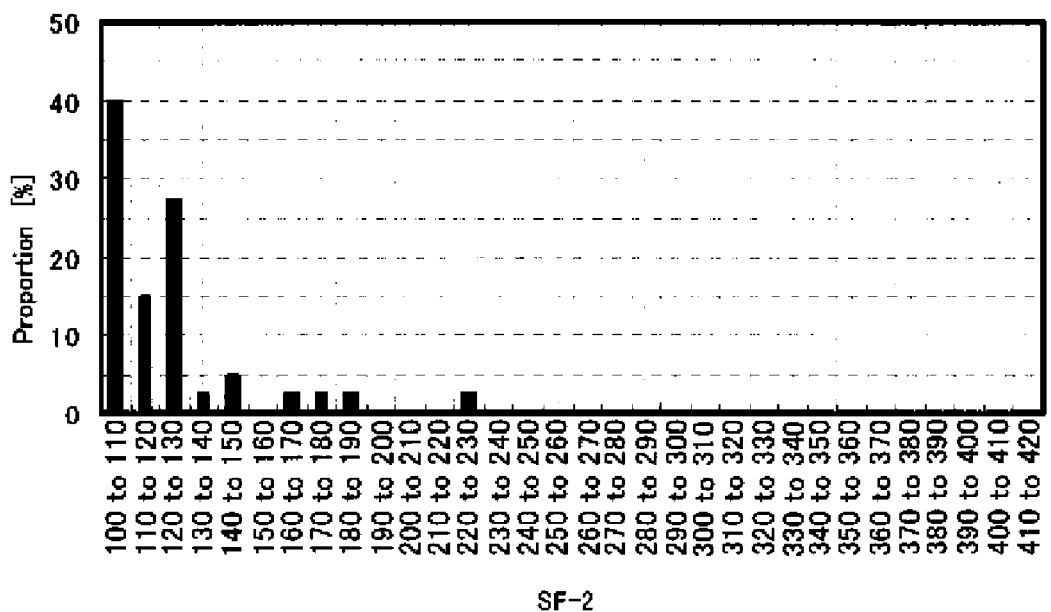
[FIG. 28]
Figure 29:
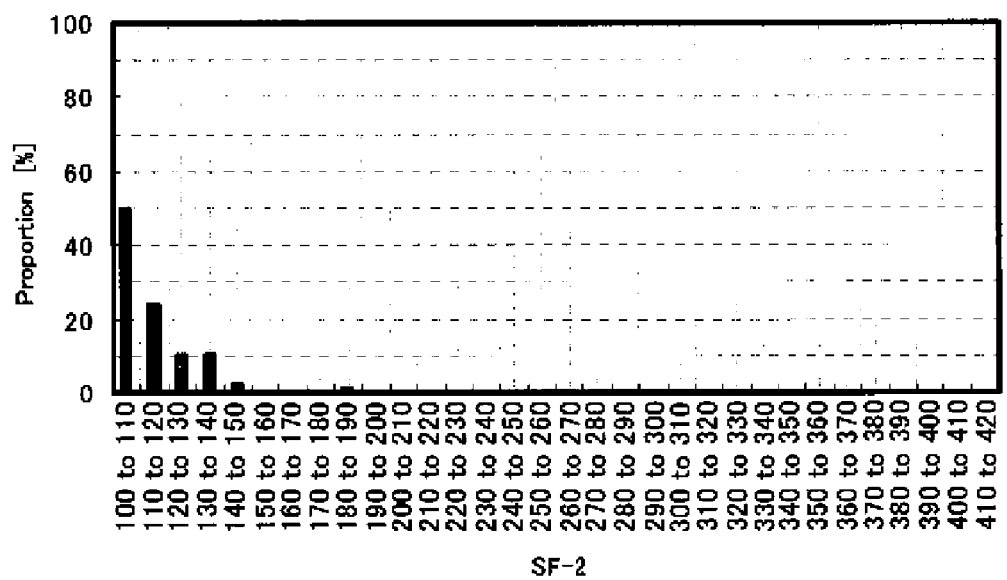
[FIG. 29]
Figure 30:
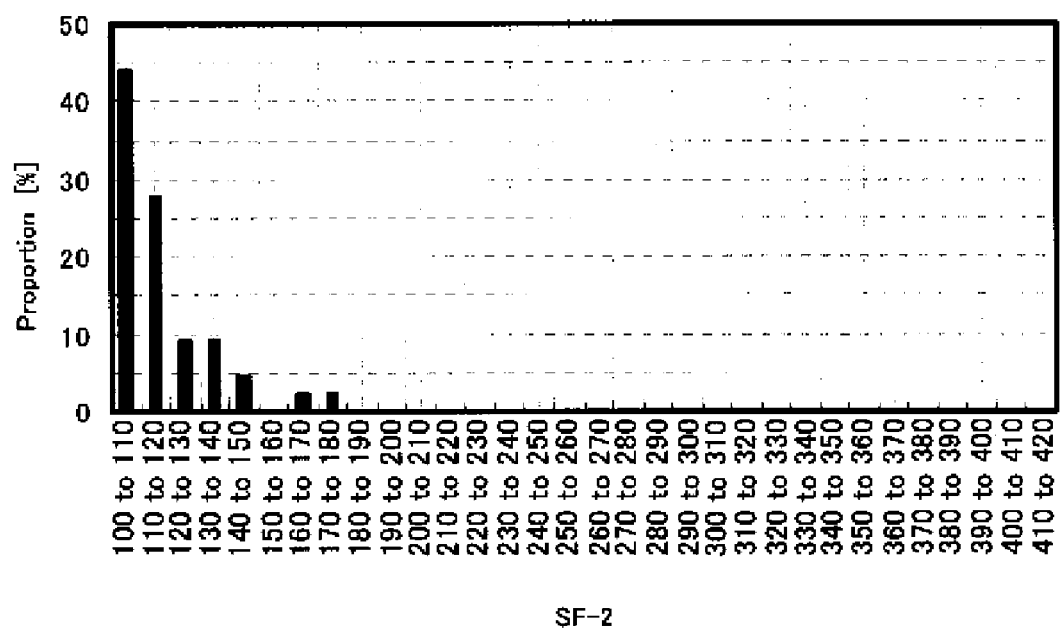
[FIG. 30]

In the case of the roller of Example 1, in each of the first and second observation regions, cell diameter was normally distributed around the mean value (about 10 μm), and the amount of cells having an aspect ratio of 1.3 or less was found to be 87% or more. As shown in FIGS. 13 and 14, in the case of the roller of Example 1, virtually no difference was observed in shape factor SF1 between cells of the first observation region and those of the second observation region, and, in each of the observation regions, most cells exhibited an SF1 of 130 or less; specifically, an SF1 falling within a narrow range around 120 (mean value). Thus, the roller of Example 1 was found to have substantially true spherical cells. In addition, as shown in FIGS. 25 and 26, in each of the observation regions, most cells exhibited an SF2 (indicating to the remoteness from complete roundness; i.e., circumferential irregularities) falling within a narrow range of 130 or less.

Also, in the case of the roller of Example 2 or 3, in each of the first and second observation regions, cell diameter was normally distributed around the mean value (about 10 μm), and the amount of cells having an aspect ratio of 1.3 or less was found to be 70% or more. As shown in FIGS. 15 to 18, in the case of the roller of Example 2 or 3, virtually no difference was observed in shape factor SF1 between cells of the first observation region and those of the second observation region, and, in each of the observation regions, 80% or more of all cells exhibited an SF1 falling within a narrow range of 150 or less. Thus, the roller of Example 2 or 3 was found to have substantially true spherical cells. In addition, as shown in FIGS. 27 to 30, in each of the observation regions, 80% or more of all cells exhibited an SF2 (indicating to the remoteness from complete roundness; i.e., circumferential irregularities) of 130 or less.

Figure 19:
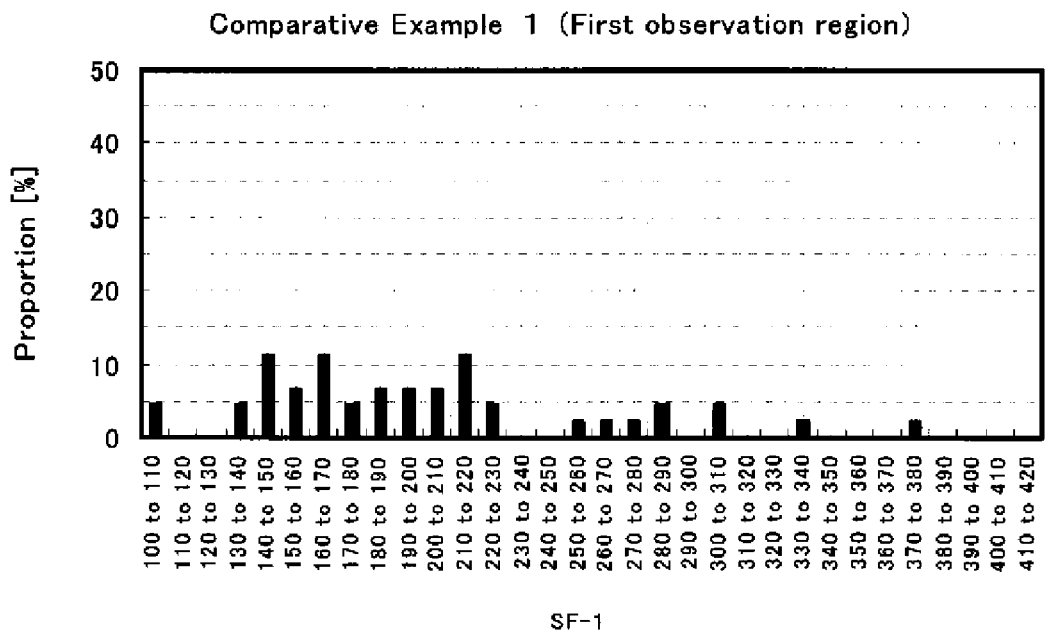
[FIG. 19]
Figure 20:
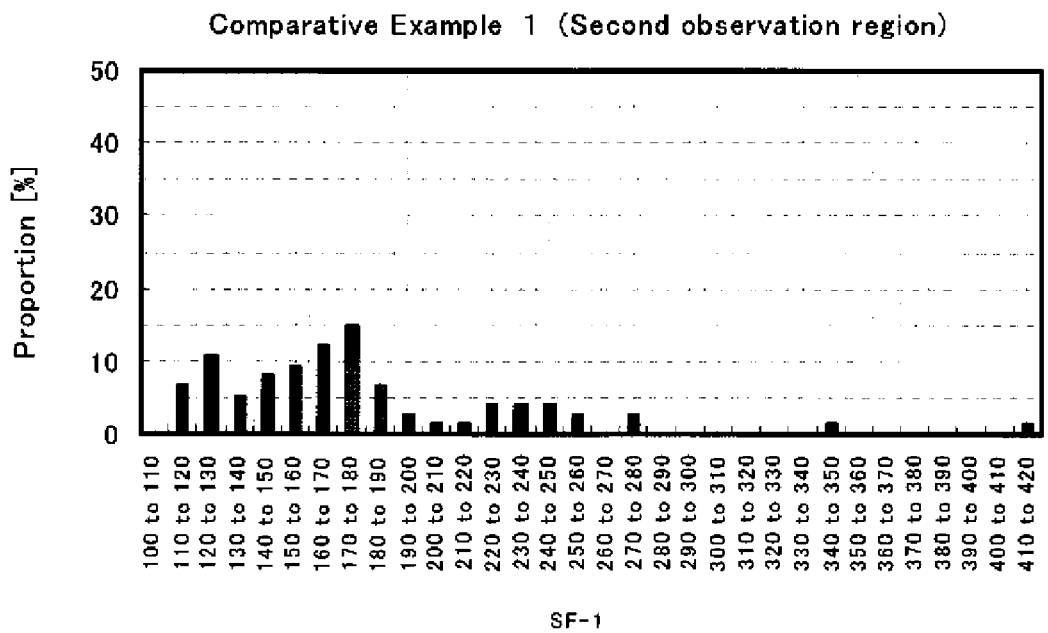
[FIG. 20]
Figure 21:
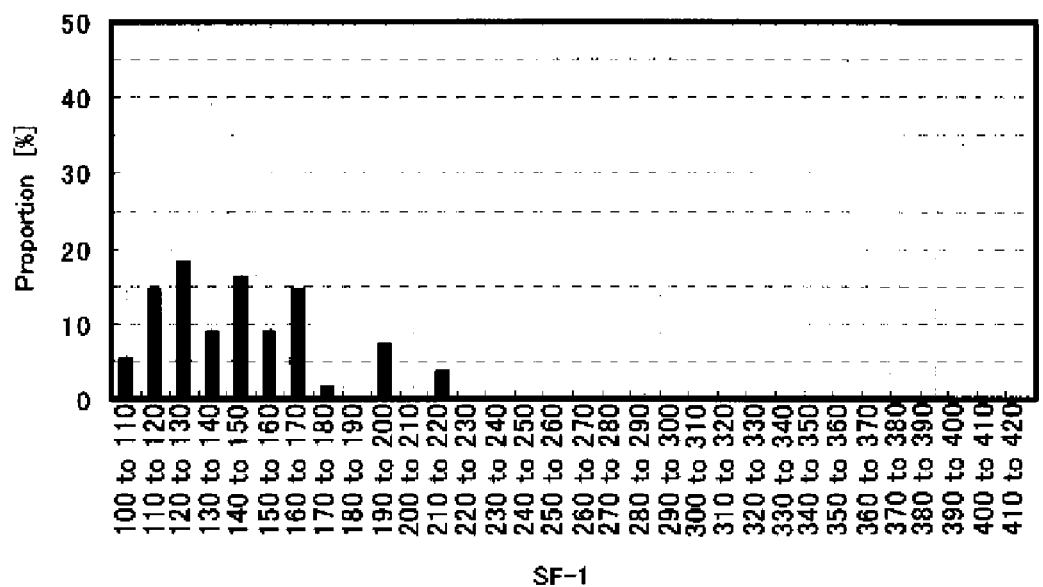
[FIG. 21]
Figure 22:
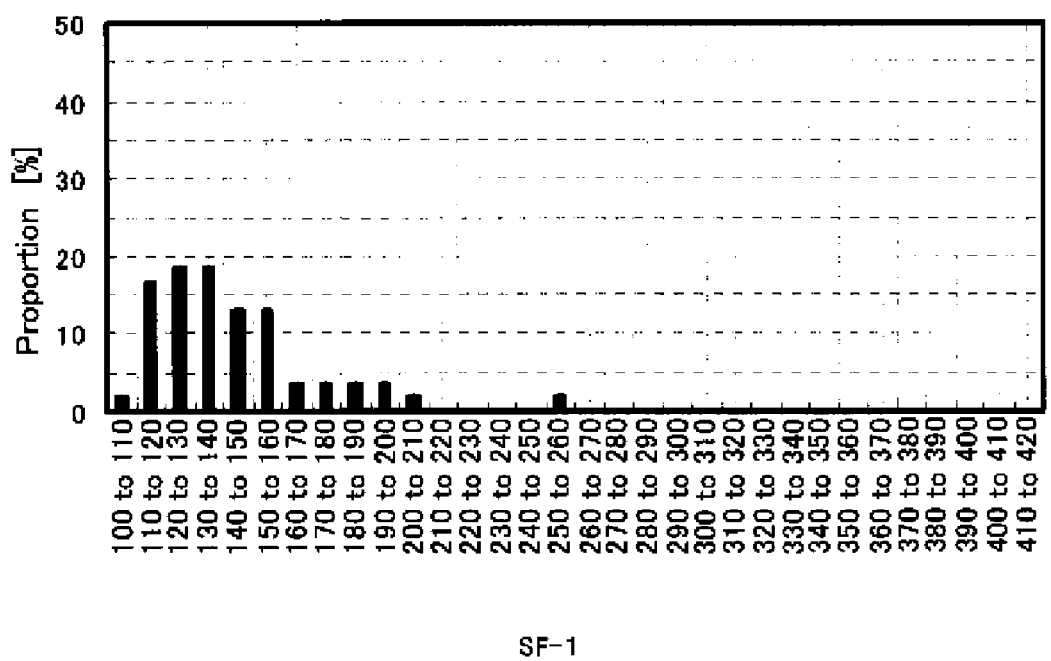
[FIG. 22]
Figure 23:
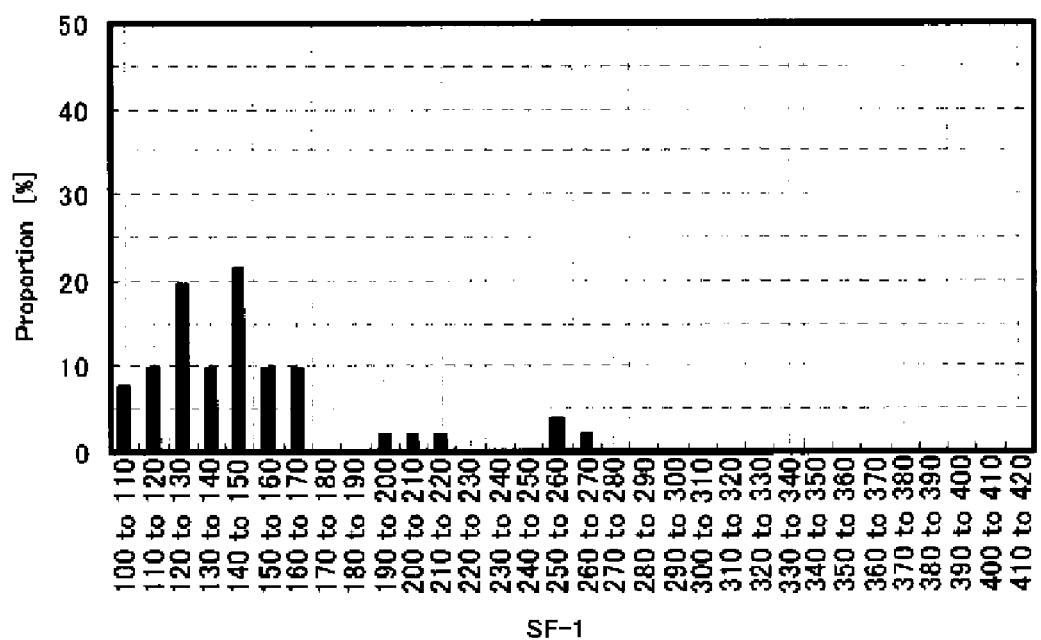
[FIG. 23]
Figure 24:
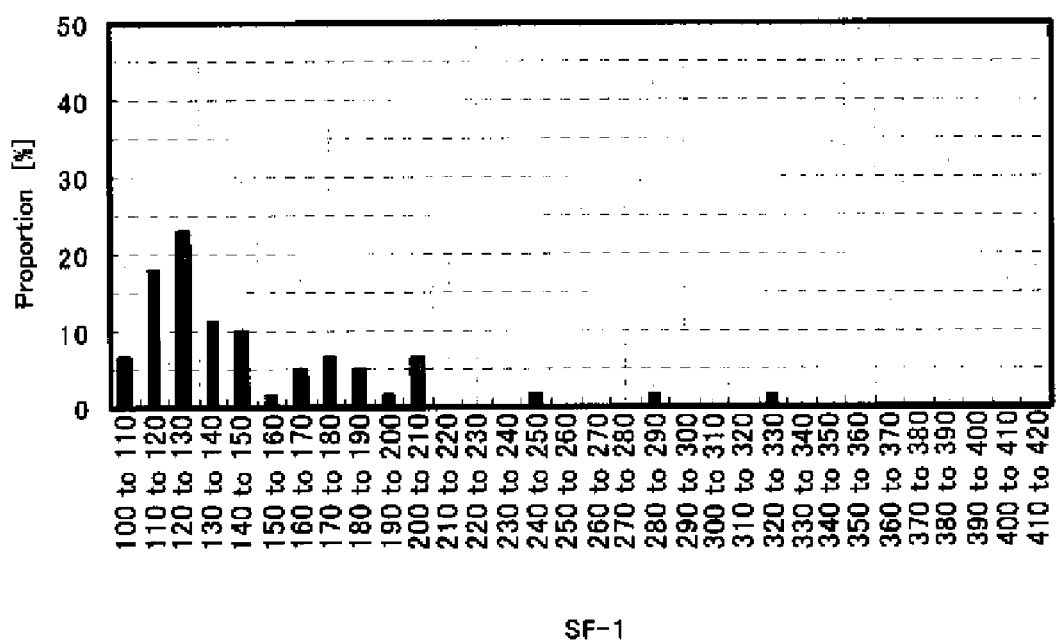
[FIG. 24]
Figure 31:
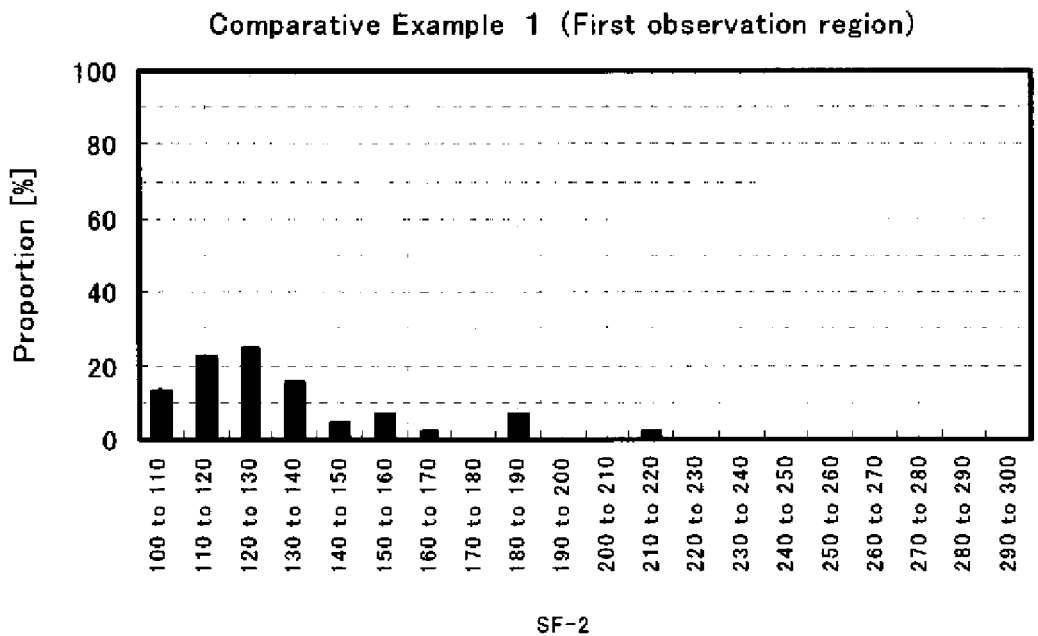
[FIG. 31]
Figure 32:
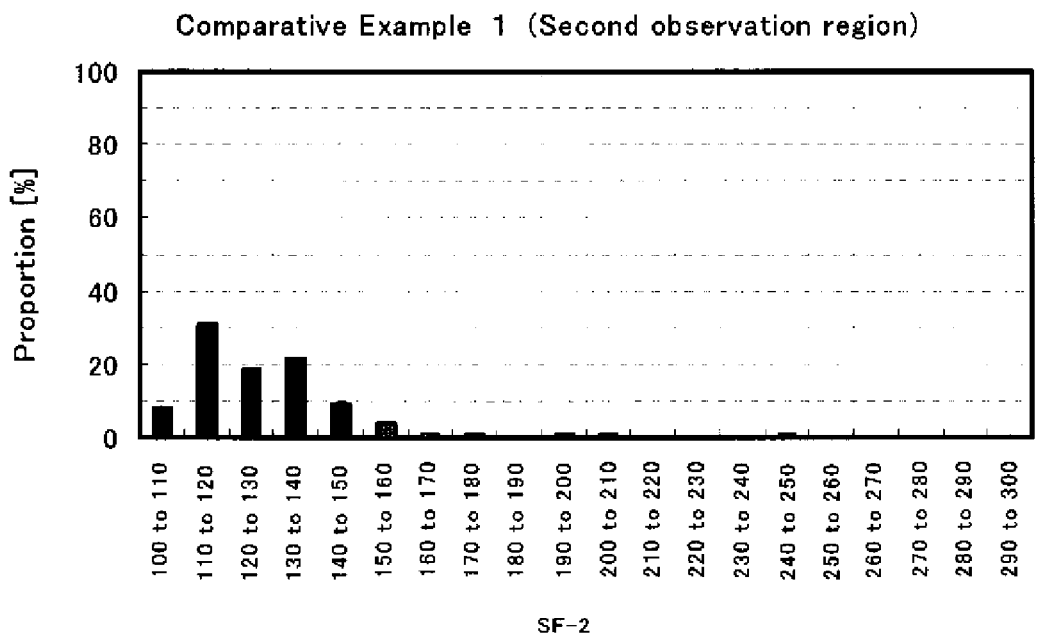
[FIG. 32]
Figure 33:
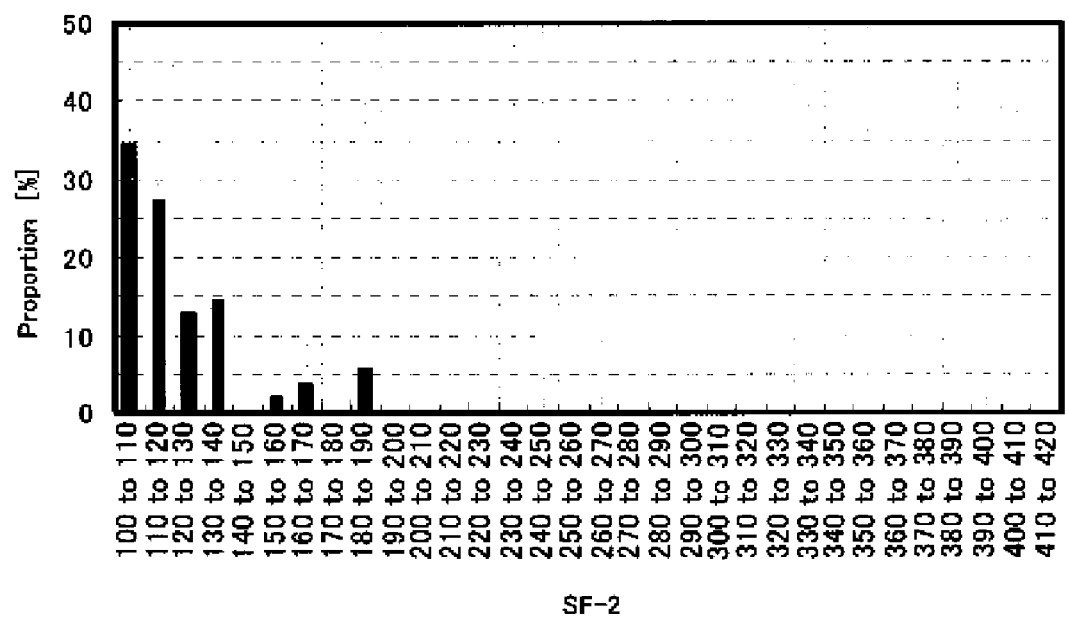
[FIG. 33]
Figure 34:
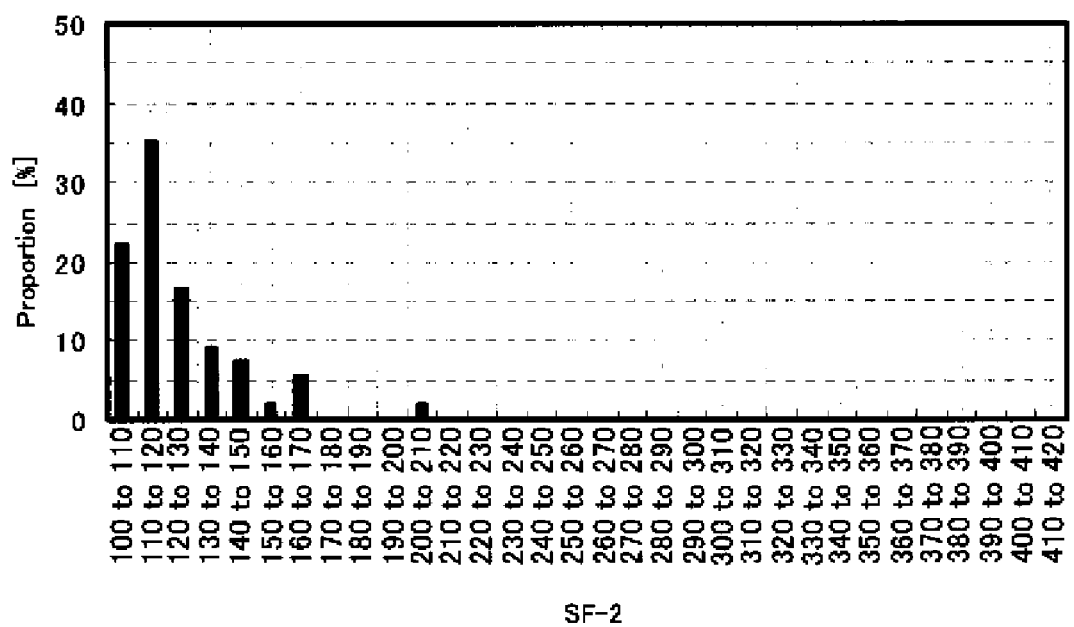
[FIG. 34]
Figure 35:
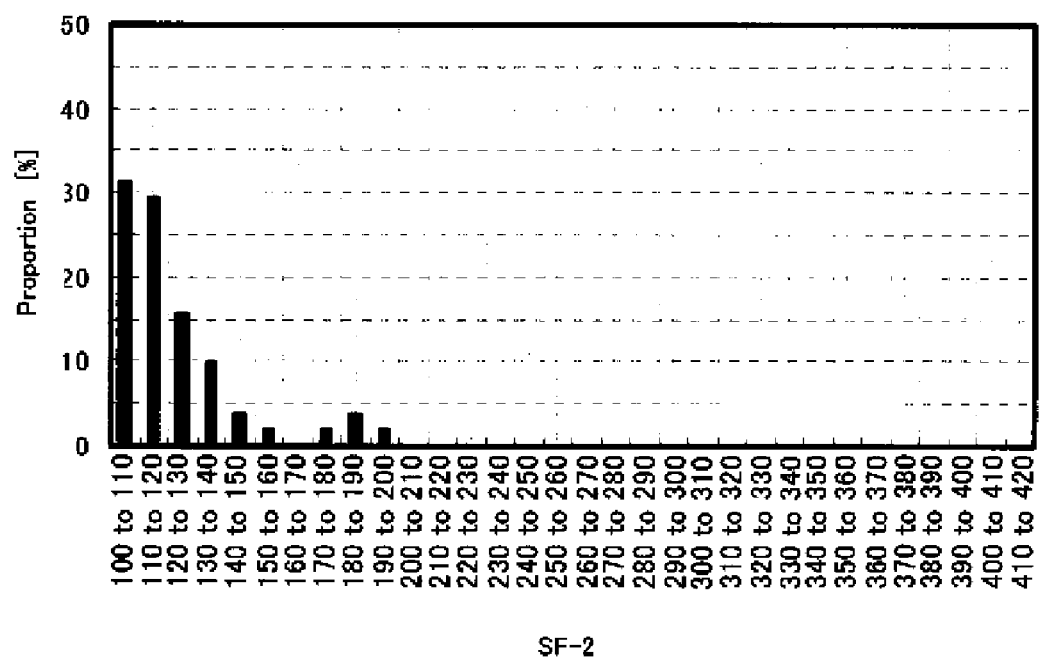
[FIG. 35]
Figure 36:
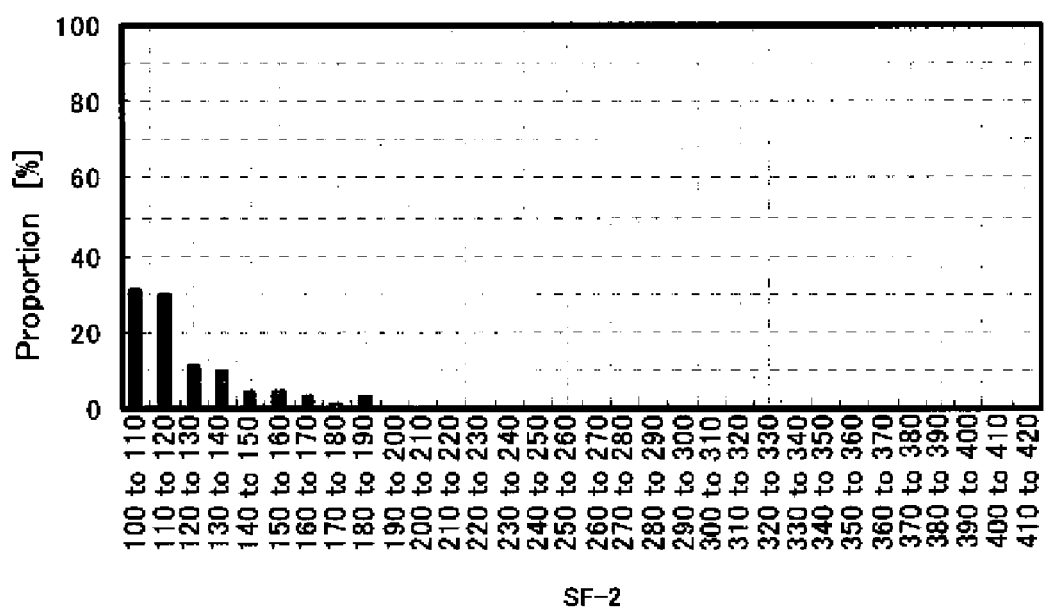
[FIG. 36]

In contrast, in the case of the roller of Comparative Example 1, the amount of cells having an aspect ratio of 1.3 or less was found to be small; i.e., large amounts of cells were found to be in a flattened spherical form. As shown in FIGS. 19 and 20, in the case of the roller of Comparative Example 1, considerably large amounts of cells exhibited high SF1, and cells of different SF1 values were distributed in each of the first and second observation regions. Thus, the roller of Comparative Example 1 was found to have non-uniform and considerably flattened cells. In addition, as shown in FIGS. 31 and 32, in the case of the roller of Comparative Example 1, cells of different shape factor SF2 values were distributed in each of the observation regions, and large amounts of cells exhibited high SF2, as compared with the cases of Examples 1 to 3. Thus, the roller of Comparative Example 1 was also found to have non-uniform and distorted spherical cells.

In the case of the roller of Comparative Example 2 or 3, the amount of cells having an aspect ratio of 1.3 or less was found to be small (62 to 67%); i.e., the amount of cells having a flattened spherical form was found to be large, as compared with the cases of Examples 1 to 3. As shown in FIGS. 21 to 24, in the case of the roller of Comparative Example 2 or 3, large amounts of cells exhibited high SF1 (i.e., 60 to 70% of all cells exhibited an SF1 of 150 or less), and cells of different SF1 values were distributed in each of the first and second observation regions. Thus, the roller of Comparative Example 2 or 3 was found to have non-uniform and considerably flattened cells. In addition, as shown in FIGS. 33 to 36, in the case of the roller of Comparative Example 2 or 3, cells of different shape factor SF2 values were distributed in each of the observation regions, and large amounts of cells exhibited high SF2 (i.e., 70 to 80% of all cells exhibited an SF2 of 130 or less), as compared with the cases of Examples 1 to 3. Thus, the roller of Comparative Example 2 or 3 was also found to have non-uniform and distorted spherical cells.

In the roller of Example 1, the amount of cells having a diameter of 50 μm or less was found to be 100%, and the number of cells/mm$^2$ was found to be 4,884 or more. In contrast, in the roller of Comparative Example 1, the amount of cells having a diameter of 50 μm or less was found to be 0%, and the number of cells/mm$^2$ was found to be 22 or less. These data indicate that, in the roller of Example 1, very fine cells are densely distributed, as compared with the roller of Comparative Example 1.

Test Example 3

Figure 37:
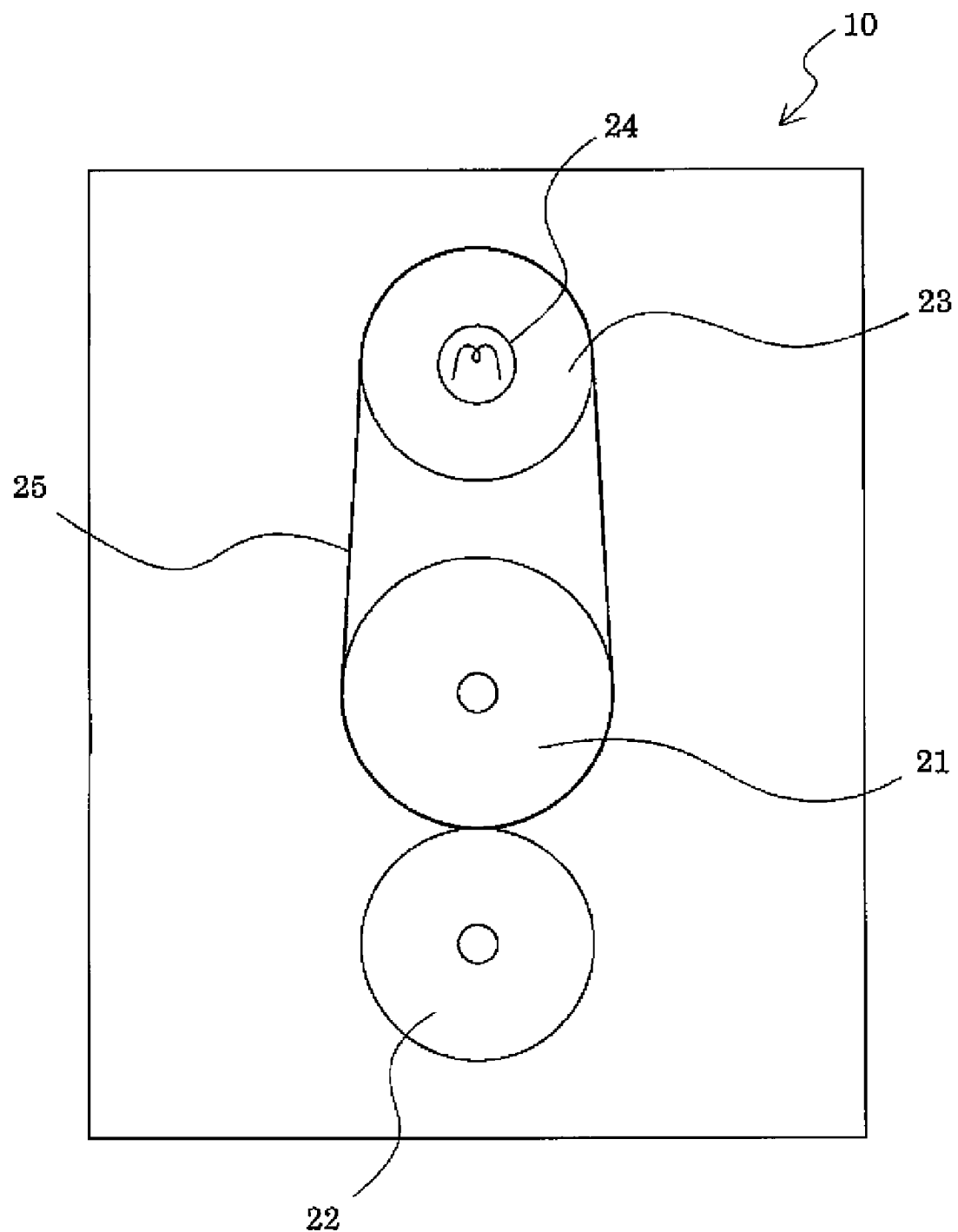
[FIG. 37]

A durability test was carried out by using a belt fixing apparatus 10 as shown in FIG. 37, which includes a fixing roller 21, a pressure roller 22, a heating roller 23, and a fixing belt 25. In the belt fixing apparatus 10, the fixing roller 21 is rotatably supported by a shaft; the pressure roller 22 is rotatably supported below the roller 21 so that the roller 22 abuts the roller 21; and the heating roller 23 is rotatably supported generally above the roller 21. A heat source 24 is provided in the interior of the heating roller 23, and the fixing belt (endless heat transfer belt) 25 is wound around the heating roller 23 and the fixing roller 21.

Each of the rollers of Examples 1 to 3 and Comparative Examples 1 to 3 was applied, as the fixing roller, to the belt fixing apparatus 10, and the time elapsed until the fixing roller was broken was measured. There was employed, as the pressure roller 22, a roller prepared by covering a silicone sponge (φ: 35 mm, thickness: 2.5 mm, hardness (Asker C):68°) with a PFA tube (thickness: 30 μm). The nip width was adjusted to 10.5 to 11.5 mm. The durability test was carried out under the following conditions: belt surface (heated to 160 to 170° C.), and continuous operation (8 hours/day under heating, and 16 hours/day with turning off the heat source (heater)). For each type of roller, the durability test was carried out five times. Upon the durability test, the warm-up time of each roller was measured, and the ratio of the warm-up time of the roller to that of the roller of Comparative Example 1 was determined. As used herein, "warm-up time" refers to the rise time in a standby state. The results are shown in Table 2.

TABLE 2

|  |  | Ex. 1 | Ex. 2 | Ex. 3 | Comp. Ex. 1 | Comp. Ex. 2 | Comp. Ex. 3 |
|---|---|---|---|---|---|---|---|
| Warm-up time ratio | Average of five measurements | 1.01 | 1.01 | 1.01 | 1 | 1.01 | 1.01 |
| Endurance time | 1 | 576 | 623 | 506 | 120 | 360 | 325 |
|  | 2 | 624 | 594 | 516 | 96 | 384 | 358 |
|  | 3 | 528 | 542 | 555 | 48 | 408 | 316 |
|  | 4 | 572 | 528 | 574 | 48 | 432 | 371 |
|  | 5 | 534 | 556 | 522 | 24 | 228 | 321 |

(Summary of the Results)

As shown in Table 2, the warm-up time of each of the rollers of Examples 1 to 3 and Comparative Examples 2 and 3 was almost equal to that of the roller of Comparative Example 1. These data indicate that the rollers of Examples 1 to 3 exhibit heat insulation property comparable to that of a conventional sponge roller.

As is clear from Table 2, each of the rollers of Examples 1 to 3 can be continuously operated for 500 hours or longer, and, in contrast, the roller of Comparative Example 1 may be generally broken through operation for 100 hours or shorter, and the roller of Comparative Example 2 or 3 may be broken through operation for about 300 hours. These data indicate that the rollers of Examples 1 to 3 exhibit durability higher than that of the rollers of Comparative Examples 1 to 3 (i.e., conventional rollers).

The invention claimed is:

1. An elastomer porous material, wherein:
   when cells in a first observation region of a first cross section are observed at a certain magnification, cells having a shape factor SF2 of 130 or less account for 80% or more of all cells in the first observation region, wherein SF2 indicates remoteness from complete roundness and is represented by formula F1:

$$SF2 = \frac{P^2}{4\pi A} \times 100,$$

wherein A represents an area of each cell, and P represents a perimeter length thereof, and
   when cells in a second observation region of a second cross section orthogonal to the first cross section are observed at said certain magnification, cells having the shape factor SF2 of 130 or less account for 80% or more of all cells in the second observation region.

2. The elastomer porous material according to claim 1, which is produced from an emulsion composition comprising, as a continuous phase, a liquid rubber material which forms an elastomer through curing.

3. The elastomer porous material according to claim 2, wherein the liquid rubber material is a liquid silicone rubber material.

4. The elastomer porous material according to claim 1, wherein, in the first or second observation region, cells having a diameter of 50 μm or less account for 50% or more of all cells.

5. The elastomer porous material according to claim 1, wherein, in each of the first and second observation regions, cells having an aspect ratio a/b of 1.3 or less account for 70% or more of all cells, wherein a represents a maximum diameter of each cell and b represents a length of a minor axis of that cell as measured in a direction orthogonal thereto.

6. The elastomer porous material according to claim 1, which exhibits a porosity of 30% or more and has 200 or more cells per mm$^2$ as observed in a cross section.

7. A roll member comprising the elastomer porous material as recited in claim 1.

8. A fixing member comprising the elastomer porous material as recited in claim 1.

9. A method for producing an elastomer porous material, comprising:
   preparing, under reduced pressure, an emulsion composition comprising, as a continuous phase, a liquid rubber material which forms an elastomer through curing; and curing the emulsion composition while removing a dispersion phase, to thereby produce the elastomer porous material, wherein, when cells in a first observation region of a first cross section are observed at a certain magnification, cells having a shape factor SF2 of 130 or less account for 80% or more of all cells in the first observation region, wherein SF2 indicates remoteness from complete roundness and is represented by formula F2:

$$SF2 = \frac{P^2}{4\pi A} \times 100,$$

wherein A represents an area of each cell, and P represents a perimeter length thereof, and when cells in a second observation region of a second cross section orthogonal to the first cross section are observed at said certain magnification, cells having the shape factor SF2 of 130 or less account for 80% or more of all cells in the second observation region.

10. The method for producing an elastomer porous material according to claim 9, wherein the liquid rubber material is a liquid silicone rubber material.

11. The method for producing an elastomer porous material according to claim 9, wherein the emulsion composition is a water-in-oil emulsion composition comprising a liquid silicone rubber material, a silicone oil material having interfacial activity, and water.

12. The method for producing an elastomer porous material according to claim 9, wherein, in the first or second observation region, cells having a diameter of 50 μm or less account for 50% or more of all cells.

13. The method for producing an elastomer porous material according to claim 9, wherein, in each of the first and second observation regions, cells having an aspect ratio a/b of 1.3 or less account for 70% or more of all cells, wherein a represents a maximum diameter of each cell and b represents a length of a minor axis of that cell as measured in a direction orthogonal thereto.

14. The method for producing an elastomer porous material according to claim 9, producing an elastomer porous material exhibiting a porosity of 30% or more and having 200 or more cells per mm$^2$ as observed in a cross section.

* * * * *